United States Patent
Kakutani

(10) Patent No.: US 7,583,404 B2
(45) Date of Patent: Sep. 1, 2009

(54) IMAGE PROCESSING APPARATUS FOR CONVERTING COLOR DATA BY REFERRING TO A RECONSTRUCTED COLOR CONVERSION TABLE AND AN IMAGE PROCESSING METHOD FOR THE SAME

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 940 days.

(21) Appl. No.: 10/688,866

(22) Filed: Oct. 16, 2003

(65) Prior Publication Data

US 2004/0246527 A1    Dec. 9, 2004

(30) Foreign Application Priority Data

Oct. 17, 2002  (JP)  ............................. 2002-303426

(51) Int. Cl.
*H04N 1/60*   (2006.01)
*G03F 3/00*   (2006.01)
*G06K 9/00*   (2006.01)

(52) U.S. Cl. .......................... 358/1.9; 358/518; 382/167

(58) Field of Classification Search .................. 358/1.9, 358/3.01, 3.02, 3.03, 3.06, 3.09, 3.1, 3.23, 358/518, 520, 521, 523, 530, 534, 3.21, 519, 358/525; 382/162, 167, 254, 276, 166; 345/87, 345/88, 589, 591, 596, 597, 598, 599, 600, 345/601, 602, 604, 606, 608, 613; 347/15, 347/84, 18; 369/88; 348/613
See application file for complete search history.

(56) References Cited

U.S. PATENT DOCUMENTS 6,023,351  A  *  2/2000  Newman ..................... 358/524
7,046,844  B2 *  5/2006  Kakutani ..................... 382/167
2004/0046766  A1 *  3/2004  Falk ........................... 345/600

FOREIGN PATENT DOCUMENTS

WO     WO 02/32113       4/2002

OTHER PUBLICATIONS

Kakutani, Image Processing Device, Image Processing Method, Recorded Medium, and Program, Apr. 18, 2002, PCT Pub. No. WO02/32113, all pages.*

* cited by examiner

*Primary Examiner*—King Y Poon
*Assistant Examiner*—Peter L Cheng
(74) *Attorney, Agent, or Firm*—Martine Penilla & Gencarella, LLP

(57) ABSTRACT

An image processing apparatus of the invention refers to a color conversion table, which represents a mapping of first image data expressed in a first color system to second image data expressed in a second color system, so as to attain color conversion of first image data into second image data. The second image data stored in the color conversion table have gone through an encoding process, which enhances a variation in tone value of the second image data in a predetermined tone area while compressing the variation in tone value of the second image data in a residual tone area. The color conversion process decodes the color conversion table, reconstructs the decoded color conversion table, again encodes the reconstructed color conversion table, refers to the encoded color conversion table for color conversion, and decodes the resulting encoded second image data. This arrangement ensures highly accurate color conversion.

10 Claims, 17 Drawing Sheets

IMAGE PROCESSING APPARATUS FOR CONVERTING COLOR DATA BY REFERRING TO A RECONSTRUCTED COLOR CONVERSION TABLE AND AN IMAGE PROCESSING METHOD FOR THE SAME

BACKGROUND OF THE INVENTION

1. Field of the Invention

The present invention relates to a technique of color conversion of color image data with reference to a color conversion table. More specifically the invention pertains to a technique of converting color image data expressed in a first color system into color image data in a second color system with high accuracy by referring to a reconstructed color conversion table.

2. Description of the Related Art

An image display device that displays a color image typically carries out a process of color conversion, in order to compensate for a difference between a color system adopted for generation of color image data and a color system adopted for display of the color image. For example, in the case of printing a color image, color image data are typically expressed in an RGB color system, while a printing device generally adopts a CMY color system that expresses an output color by quantities of respective color inks, cyan (C), magenta (M), and yellow (Y). In this case, conversion of the color image data expressed in the RGB color system into data expressed in the CMY color system is required to print a color image. Even when both an image data generation device and an image display device are capable of treating the color image data expressed in the RGB color system, there is often a subtle difference in color characteristics between the image display device and the image data generation device. Conversion of the color system of the generated color image data into the color system adopted in the image display device is thus often required to compensate for the difference in color characteristics and accurately reproduce the original color of the generated image data. The color conversion process converts the color system of the image data for these purposes.

The analytical technique of color conversion is extremely complicated. The color conversion process thus generally refers to a color conversion table (LUT). The following description regards color conversion of image data expressed in the RGB color system into image data expressed in the CMY color system, as an example. The procedure first divides an RGB color space into lattices, where each of lattice points expresses color image data (RGB image data) corresponding to its coordinate values. The procedure specifies CMY image data, which is expressed in the CMY color system and is obtained by conversion of the RGB image data, at each lattice point and stores a mapping of such CMY image data to the respective lattice points. The LUT (color conversion table) is a numerical table representing a mapping of converted image data in the target color system (the CMY image data in this example) to each lattice point obtained by dividing the color space in the source color system (the RGB color space in this example) into lattices. Reference to the LUT set in advance enables quick color conversion of the color image data.

The lattice points in the LUT are specified by dividing the respective coordinate axes in the color space. The number of lattice points accordingly increases as the third power of the number of divisions and significantly expands the data volume of the LUT. A method typically adopted to save the storage capacity stores an LUT having a less number of divisions to occupy a relatively small data capacity and produces an LUT having an increased number of divisions according to the requirement. Image data corresponding to newly added lattice points by the increase in number of divisions are computed by interpolation. The method may vary the positions of division to add new lattice points, instead of or in addition to the increase in number of divisions. The process of generating a new LUT from a stored LUT according to the requirements is referred to as 'reconstruction of the LUT' in the specification hereof. The stored LUT for reconstruction of the new LUT is referred to as the 'reference LUT' in the specification hereof.

In the case of reconstruction of the LUT, the higher accuracy required for the image data stored in the LUT may lower the accuracy of color conversion with the reconstructed LUT, even if the required accuracy of color conversion is assumed on the reference LUT. Even when the data computed by interpolation is a numerical value of sufficient accuracy, the numerical value is rounded in the process of writing the result of computation at each lattice point in the reconstructed LUT. This causes an error. A method of writing the results of computation with high accuracy at respective lattice points naturally decreases the rounding error in the writing process. But this undesirably expands the data volume of the reconstructed LUT. In order to solve this problem, one proposed technique carries out an encoding process to encode image data in the process of reconstructing the LUT (for example, see International Publication No. 02/32113).

The technique proposed in this cited reference multiplies each numerical value computed by interpolation by a predetermined coefficient in an area having the high accuracy required for the image data to be stored in the LUT and stores the multiplied value in the LUT. When the rounding process rounds off the figures after the decimal point in storage of each numerical value, for example, the proposed technique decouples the numerical value prior to storage. The numerical value thus keeps the accuracy of one decimal place. This technique decouples the numerical value and converts a small numerical variation in the first place after the decimal point, which is expected to be rounded in storage, into a non-rounded significant numerical variation. The stored tenfold numerical value is read out and is returned to $\frac{1}{10}$ at any adequate timing.

The high accuracy is not required for the image data stored in the whole area of the reconstructed LUT. In printing devices like inkjet printers, when only small quantities of respective color inks are used, even a slight variation in quantity of one ink significantly changes the color expressed. High accuracy is accordingly required for the data on the quantities of respective color inks C, M, and Y. When a sufficiently large quantity of ink is used, on the other hand, the data is not required to have significantly high accuracy. The technique accordingly enhances a variation in tone value of ink quantity data in an area having small ink quantity data and requiring high accuracy, while compressing the variation in tone value of the ink quantity data in an area having large ink quantity data and requiring no high accuracy, prior to storage in the LUT. The encoding process in the specification hereof enhances the variation in tone value in areas requiring high accuracy, while compressing the variation in tone value in areas requiring no high accuracy. Combination of the encoding process with reconstruction of the LUT ensures the required accuracy of color conversion. Color-converted image data according to the reconstructed LUT has areas of the enhanced tone variation, such as areas of small ink quantities, and areas of the compressed tone variation, such as areas of large ink quantities. The color-converted image data is subjected to a predetermined conversion at an adequate timing to restore the original tone variations. In the specification hereof, the process of restoring the tone variations enhanced or compressed by the encoding process is called a 'decoding process'. The technique described in the above cited reference ensures highly accurate color conversion of color image data without increasing the data volume of the LUT to display or print a high-quality color image.

SUMMARY OF THE INVENTION

The prior art technique of storing the encoded image data in the reference LUT and reconstructing the LUT from the reference LUT may, however, lower the accuracy of color conversion, regardless of execution of the encoding process on the image data.

The object of the invention is thus to solve the problem of the prior art technique and to provide a technique of adequately reconstructing an LUT from a reference LUT, which stores encoded image data, so as to attain color conversion without lowering conversion accuracy.

In order to attain at least part of the above and the other related objects, the present invention is directed to an image processing apparatus that converts first image data expressed in a first color system into second image data expressed in a second color system by referring to a color conversion table. The image processing apparatus comprising: a color conversion table storage module that stores the color conversion table representing a mapping of second image data expressed in the second color system to multiple lattice points, at which first image data generated in a color space of the first color system and expressed in the first color system are registered, wherein the color conversion table is encoded and represents a mapping of encoded second image data to the multiple lattice points, where the encoded second image data are obtained by an encoding process, which enhances a variation in tone value of the second image data in a predetermined tone area in the first color system while compressing the variation in tone value of the second image data in a residual tone area; an intermediate table generation module that makes the color conversion table subjected to a decoding process, so as to generate an intermediate color conversion table, where the decoding process restores the variation in tone value enhanced or compressed by the encoding process; a color conversion table reconstruction module that specifies second image data corresponding to multiple lattice points, which are set to include at least different lattice points from lattice points included in the intermediate color conversion table, based on the intermediate color conversion table and makes the specified second image data subjected to the encoding process, so as to reconstruct the intermediate color conversion table and generate a reconstructed color conversion table; a color conversion module that refers to the reconstructed color conversion table to convert the first image data expressed in the first color system into encoded second image data, which has gone through the encoding process; and an image data decoding module that makes the encoded second image data subjected to the decoding process to cancel out the encoding process, thus specifying the second image data expressed in the second color system.

The technique of the invention is also attained by an image processing method and an image processing program.

The image processing apparatus and the corresponding image processing method of the invention ensure extremely high accuracy of color conversion and do not cause a color shift in the process of color conversion. This arrangement enables high-quality image processing.

The image processing apparatus and the image processing method of the invention store the color conversion table, which has been encoded in advance. As described above, the encoding process has the advantage of enhancing the accuracy in an area requiring the high accuracy. Storage of the color conversion table with the encoding process heightens the accuracy in the area requiring the high accuracy, thus enhancing the accuracy of color conversion, compared with storage without the encoding process.

In one preferable application of the image processing apparatus and the image processing method, the encoding process enhances or compresses the variation in tone value of the second image data, while keeping a magnitude order of the second image data.

If encoding of the second image data is carried out with the magnitude order of the second image data kept unchanged, the subsequent decoding process does not require any additional information but immediately decodes the encoded image data. This desirably simplifies the decoding process and ensures quick image processing.

One preferable method applied to generate the intermediate color conversion table stores a mapping of the encoded second image data to the non-encoded second image data as a decode table, and refers to the decode table to convert the encoded second image data stored in the color conversion table into the non-encoded second image data and thereby generate the intermediate color conversion table.

Analytical execution of the decoding process may have difficulties. The method of setting the adequate decode table in advance desirably ensures easy and accurate execution of the decoding process to generate the intermediate color conversion table.

The reconstructed color conversion table may have a greater number of lattice points than the number of lattice points included in the intermediate color conversion table.

Reference to the color conversion table having the greater number of lattice points tends to enhance the accuracy of color conversion. Reconstruction of the color conversion table including the greater number of lattice points than the number of lattice points included in the intermediate color conversion table desirably ensures accuracy color conversion of the first image data.

In another preferable application of the invention, the image processing apparatus and the image processing method make the encoded second image data subjected to the decoding process as well as conversion into dot density data, which represents a dot formation density with regard to each of various dots having different tone values expressible by a unit dot.

In an image display device that displays each image on a printing medium or a liquid crystal display medium, dots created on the medium typically express the image. The processed image data are converted into dot density data, which are supplied to the image display device to adequately express each image.

One preferable method applied to convert the encoded image data into the dot density data prepares a conversion table, which stores a mapping of the encoded second image data to the dot density data. The dot density data stored in the conversion table are obtained by decoding the encoded second image data stored in the conversion table and converting the decoded second image data. The preferable method then refers to the conversion table to directly convert the image data, which have gone through color conversion based on the reconstructed color conversion table, into the dot density data.

This arrangement ensures quick conversion of the encoded second image data into dot density data, thus attaining quick image processing.

The image processing apparatus and the image processing method of the invention may convert image data expressed in an RGB color system into image data expressed in a CMY color system.

In many cases, for example, in the case of printing color image data, the image data expressed in the RGB color system are to be converted into image data expressed in the CMY color system. In the image processing apparatus and the image processing method of the invention, conversion of the image data expressed in the RGB color system into image data expressed in the CMY color system is advantageously usable for various purposes.

In still another preferable application of the invention, the image processing apparatus and the image processing method detect a setting with regard to a priority order between a conversion accuracy of image data and a conversion speed. When the setting gives priority to the conversion speed over the conversion accuracy, generation of the intermediate color conversion table is prohibited. In this setting, the stored color conversion table, instead of the intermediate color conversion table, is used to generate the reconstructed color conversion table.

This arrangement omits the process of decoding the color conversion table to generate the intermediate color conversion table and the process of encoding the intermediate color conversion table, thus advantageously ensuring quicker image processing.

The technique of the invention is also actualized by a program or a recording medium. The computer reads the program recorded in the recording medium and attains the respective functions discussed above to ensure accuracy color conversion. These and other objects, features, aspects, and advantages of the present invention will become more apparent from the following detailed description of the preferred embodiments with the accompanying drawings.

DESCRIPTION OF THE PREFERRED EMBODIMENTS

Figure 1:
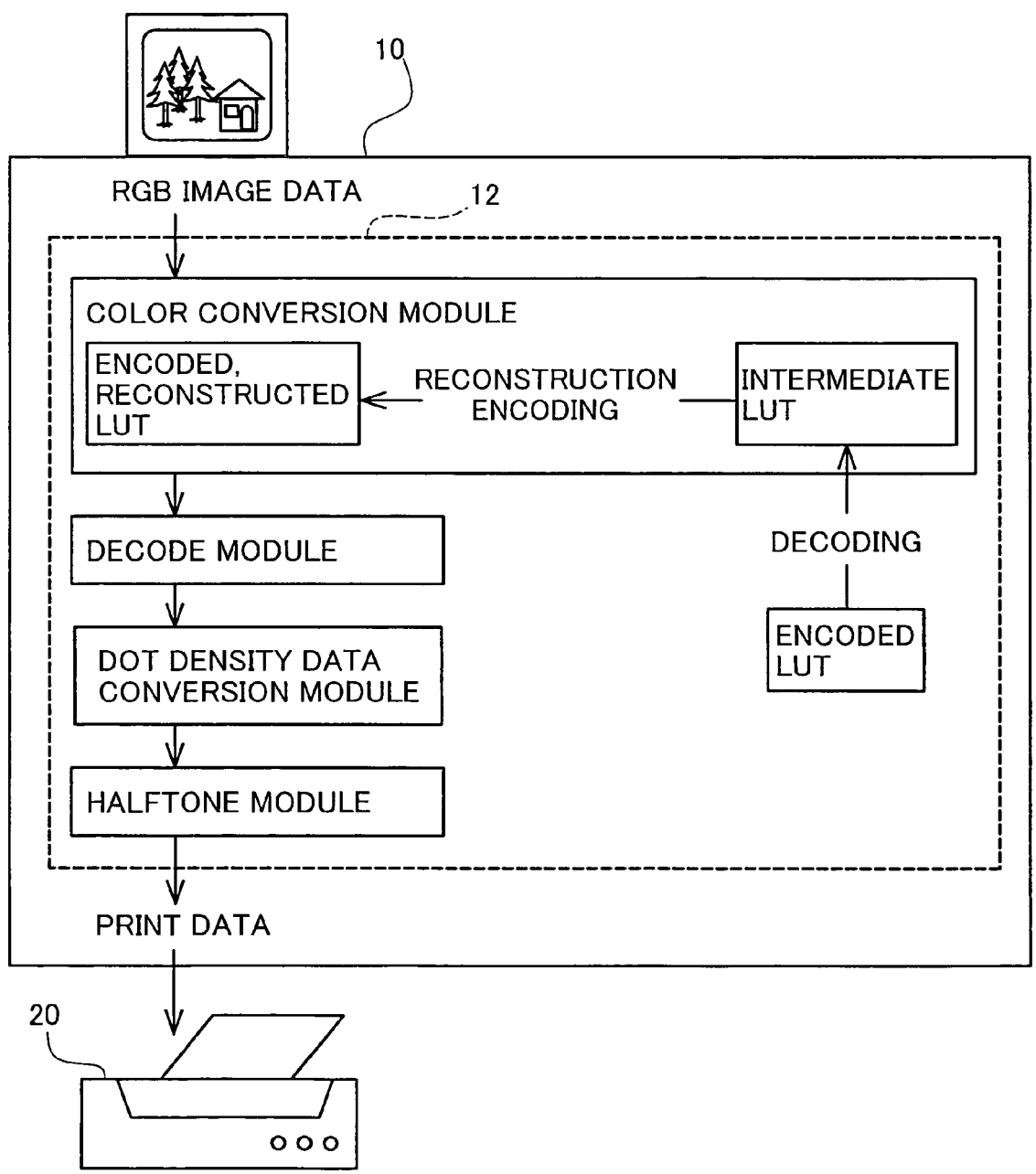
FIG. 1 shows a printing system to illustrate the outline of the invention.

Some modes of carrying out the invention are discussed below as preferred embodiments in the following sequence:
A. Outline of Invention
B. Configuration of System
C. Image Processing of First Embodiment
D. Principle of Encoding Process
E. Mechanism of Occurrence of Color Shift
F. Principle of Accuracy Enhancement
G. Image Processing of Second Embodiment A. Outline of Invention The outline of the invention is described with reference to FIG. 1, prior to the detailed description of the embodiments. FIG. 1 shows a printing system to illustrate the outline of the invention. The printing system includes a computer 10 functioning as an image processing apparatus and a color printer 20. When a predetermined program is loaded in and executed by the computer 10, the computer 10 and the color printer 20 functions in combination as the printing system. The computer 10 receives tone image data of each RGB color image from an imaging device, such as a digital camera or a color scanner, and converts the received tone image data into print data, which are expressed by formation or non-formation of respective color dots printable by the color printer 20. An exclusive program called a printer driver 12 is applied to the conversion of such image data. The tone image data of each RGB color image may be generated on the computer 10 according to any of various application programs.

The printer driver 12 has multiple modules including a color conversion module. The color conversion module converts image data in RGB color system into image data in CMY color system. The color conversion process reads an encoded LUT (color conversion table), which is separately stored in the printer driver 12, generates an encoded, reconstructed LUT, and refers to this encoded, reconstructed LUT to effectuate color conversion with high accuracy. The color conversion module reconstructs the LUT by a method discussed below, thus ensuring highly accurate color conversion. A decode module cancels out the encoding process and decodes the color-converted image data into proper CMY image data corresponding to the original RGB image data.

The printer driver 12 also includes a dot density data conversion module and a halftone module, which are characteristic of the printing system. The dot density data conversion module converts image data expressed in the CMY color system (CMY image data) into data representing densities of variable-size dots to be formed by the color printer 20. The color printer 20 is capable of forming small-size dots in addition to standard-size dots to attain high-quality image printing. The halftone module determines formation or non-formation of a dot in each pixel with regard to each of the variable-size dots recordable by the color printer 20. The halftone module specifies formation or non-formation of dots in respective pixels to ensure formation of adequate densities of dots based on the data converted by the dot density data conversion module. The RGB image data supplied to the printer driver 12 go through the required series of processing and are transmitted as resulting print data to the color printer 20. The color printer 20 creates dots of respective color inks according to the print data, thereby printing a resulting color image.

As described above, the printer driver 12 reads the encoded color conversion table (the encoded LUT), reconstructs the LUT, and refers to the reconstructed LUT to carry out color conversion. Direct reconstruction of the encoded LUT causes a color shift, which lowers the accuracy of color conversion. The color conversion module accordingly decodes the encoded LUT to generate an intermediate LUT, reconstructs the intermediate LUT, and again encodes the reconstructed LUT to generate an encoded, reconstructed LUT. The resulting reconstructed LUT has high accuracy. This reconstructed LUT ensures color conversion of RGB image data into CMY image data with high accuracy. The reason why a color shift arises to interfere with accurate color conversion, the technique of decoding the encoded LUT to generate the intermediate LUT, reconstructing the intermediate LUT, and encoding the reconstructed LUT, and the reason why this technique gives the highly accurate reconstructed LUT will be discussed later with reference to FIGS. 15 through 17.

The image processing apparatus incorporated in the printing system requires conversion into dot density data, subsequent to color conversion of RGB image data. In the illustration of FIG. 1, the dot density data conversion module is located downstream the decode module. This arrangement enables the decoding process to be carried out simultaneously with conversion of the color-converted image data into dot density data. The following describes the details of the image processing apparatus and the corresponding image processing method of the invention, based on some embodiments.

B. System Configuration

Figure 2:
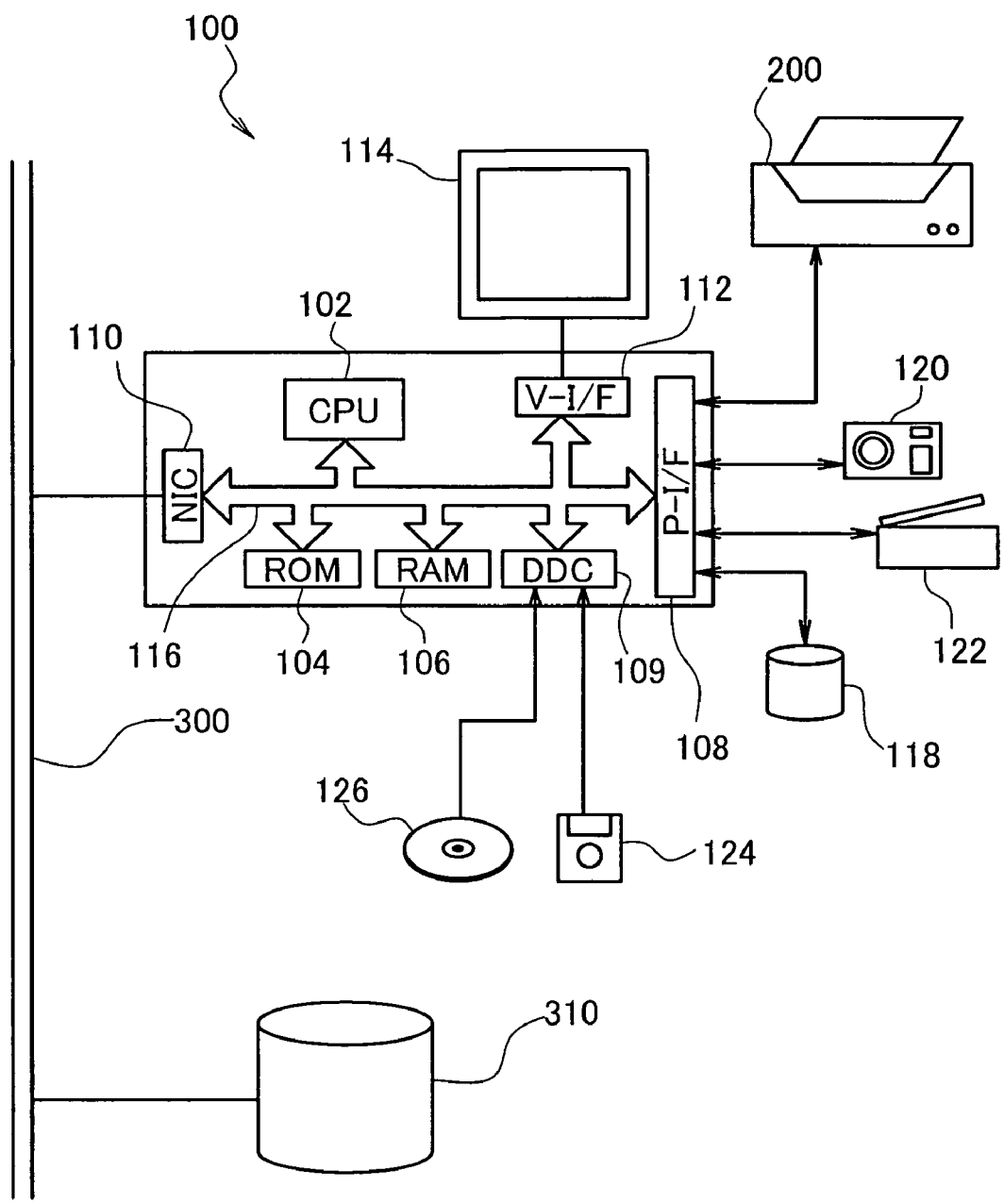
FIG. 2 shows the configuration of a computer functioning as an image processing apparatus in one embodiment of the invention.

FIG. 2 shows the configuration of a computer 100 functioning as the image processing apparatus of the embodiment. The computer 100 is a known computer including a CPU 102, a ROM 104, and a RAM 106, which are mutually connected via a bus 116.

The computer 100 is connected with a disk controller DDC 109 to read data from a flexible disk 124 or a compact disc 126, a peripheral equipment interface P-I/F 108 to transmit data to and from peripheral equipment, a video interface V-I/F 112 to actuate a CRT 114. A color printer 200 (discussed later) and a hard disk 118 are connected to the P-I/F 108. Connection of a digital camera 120 or a color scanner 122 with the P-I/F 108 enables images taken by the digital camera 120 or the color scanner 122 to be printed by the color printer 200. Attachment of a network interface card NIC 110 connects the computer 100 with a communication line 300. Such connection enables the computer 100 to acquire data stored in a storage device 310 connecting with the communication line 300.

Figure 3:
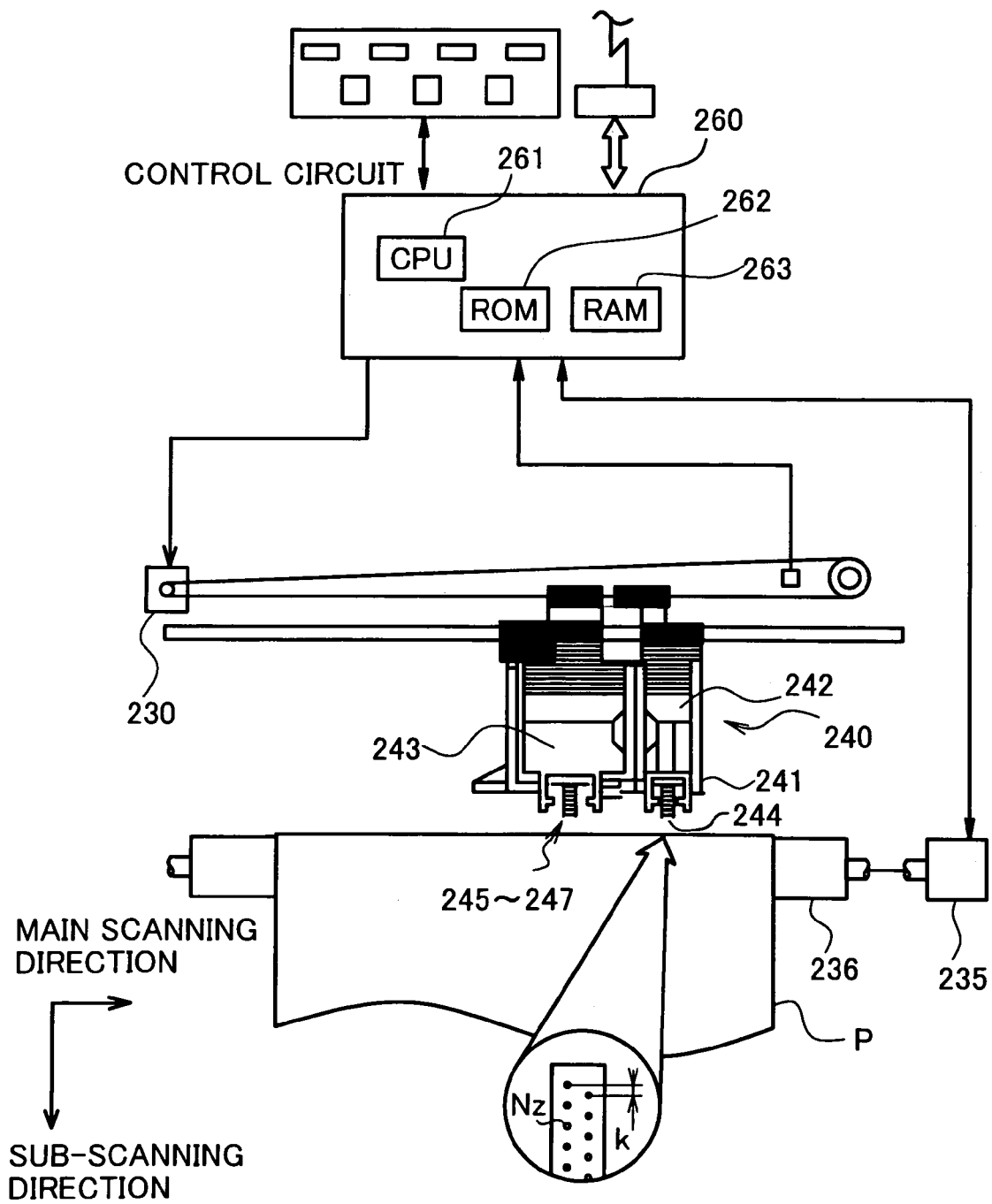
FIG. 3 schematically illustrates the structure of a printer as an image display device of the embodiment.

FIG. 3 schematically illustrates the structure of a color printer 200 in the embodiment. The color printer 200 is an inkjet printer that is capable of forming dots of four color inks, that is, cyan, magenta, yellow, and black inks. The color printer 200 may be another inkjet printer that is capable of forming dots of six color inks including light cyan ink and light magenta ink, which have lower dye concentrations than those of cyan ink and magenta ink, in addition to the above four color inks. In the description hereafter, cyan ink, magenta ink, yellow ink, black ink, light cyan ink, and light magenta ink may be abbreviated respectively as C ink, M ink, Y ink, K ink, LC ink, and LM ink. As illustrated, the color printer 200 has a mechanism that actuates a print head assembly 241 mounted on a carriage 240 to eject inks and create dots, a mechanism that activates a carriage motor 230 to move the carriage 240 back and forth along an axis of a platen 236, a mechanism that activates a paper feed motor 235 to feed a sheet of printing paper P, and a control circuit 260 that controls formation of dots, movement of the carriage 240, and the conveyance of the printing paper P.

An ink cartridge 242 containing K ink and an ink cartridge 243 containing multiple color inks, that is, C ink, M ink and Y ink, are attached to the carriage 240. Attachment of the ink cartridges 242 and 243 to the carriage 240 causes the respective color inks contained in the cartridges 242 and 243 to flow through corresponding ink conduits (not shown) and be fed to ink ejection heads 244 through 247 for the corresponding color inks, which are provided on the bottom face of the print head assembly 241. Each of the ink ejection heads 244 through 247 for the respective color inks has a nozzle array of 48 nozzles, which are arrayed at a fixed nozzle pitch k.

The control circuit 260 includes a CPU 261, a ROM 262, and a RAM 263. The control circuit 260 controls the operations of the carriage motor 230 and the paper feed motor 235 to regulate main-scanning and sub-scanning actions of the carriage 240 and ensure ejection of ink droplets from respective nozzles at adequate timings, based on the print data supplied from the computer 100. Under control of the control circuit 260, the color printer 200 creates ink dots of the respective colors at appropriate positions on a printing medium, thus printing a resulting color image.

Any of diverse methods may be applied to eject ink droplets from the ink ejection heads 244 through 247 of the respective color inks. One applicable method utilizes piezoelectric elements to eject ink. Another applicable method uses heaters located in ink conduits to produce bubbles in the ink conduits and thereby eject ink droplets. The inkjet printer may be replaced by a printer that takes advantage of thermal transfer to form ink dots on a printing medium or by a printer that takes advantage of static electricity to make toner powders of respective colors adhere to a printing medium.

Figure 4A:
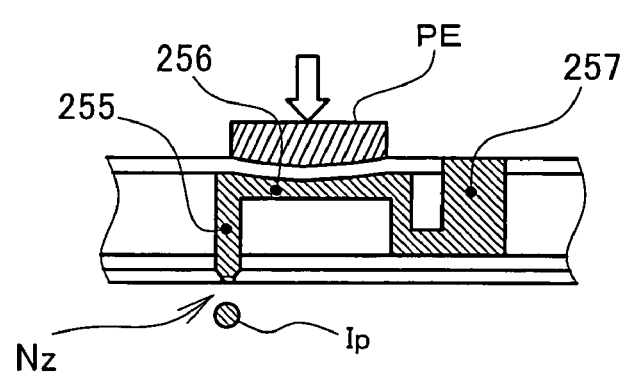
FIG. 4 shows the principle of forming variable-size dots by the printer of the embodiment.

The color printer 200 regulates the size of ink droplets ejected from nozzles to vary the size of ink dots formed on the printing paper. Prior to description of the method of creating variable-size ink dots adopted in the color printer 200, the internal structure of a nozzle for ejecting each color ink is explained. FIG. 4(a) shows the internal structure of a nozzle for ejecting each color ink. Each of the ink ejection heads 244 through 247 has multiple nozzles of this structure. As illustrated, each nozzle has an ink conduit 255, an ink chamber 256, and a piezoelectric element PE arranged above the ink chamber 256. When the ink cartridges 242 and 243 are attached to the carriage 240, each ink contained in the cartridges 242 and 243 flows through an ink gallery 257 into the ink chamber 256. As is known in the art, the piezoelectric element PE has a crystal structure deformed by application of a voltage and implements extremely high-speed conversion of electrical energy into mechanical energy. The procedure of this embodiment applies a voltage of a predetermined waveform between electrodes arranged on both ends of the piezoelectric element PE to deform the side wall of the ink chamber 256. Such deformation reduces the volume of the ink chamber 256, and an amount of ink corresponding to the volume reduction is ejected in the form of an ink droplet Ip from the nozzle Nz. The ink droplets Ip are soaked into the printing paper P set on the platen 236 to form ink dots on the printing paper P.

Figure 4B:
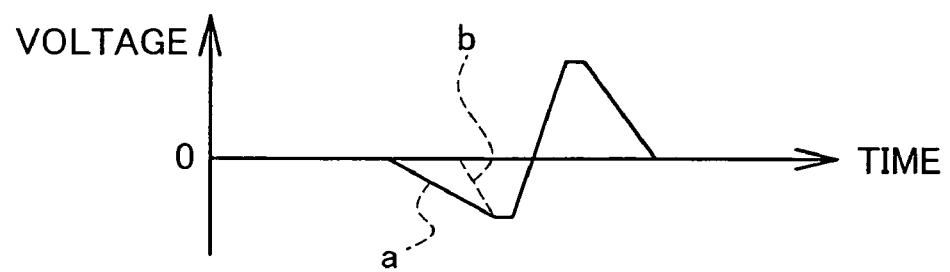

FIG. 4(b) shows the principle of varying the size of an ejected ink droplet by regulating the waveform of the voltage applied to the piezoelectric element PE. The process first applies a negative voltage to the piezoelectric element PE to suck ink from the ink gallery 257 into the ink chamber 256 and subsequently applies a positive voltage to the piezoelectric element PE to reduce the volume of the ink chamber 256 and thereby make an ink droplet Ip ejected from the nozzle Nz. An adequate ink suction speed causes an inflow of ink corresponding to the volume variation of the ink chamber 256. A higher ink suction speed, however, makes a delay in ink flow from the ink gallery 257 into the ink chamber 256, due to the resistance of the conduit between the ink gallery 257 and the ink chamber 256. The ink accordingly flows back from the ink conduit 255 into the ink chamber 256 to significantly retract the ink interface at the outlet of the nozzle Nz. In the graph of FIG. 4(b), a voltage waveform 'a' shown by the solid line represents a waveform for ink suction at an adequate speed, while a voltage waveform 'b' shown by the dashed line represents a waveform for ink suction at a higher speed than the adequate speed.

In the state of a sufficient supply of ink into the ink chamber 256, application of a positive voltage to the piezoelectric element PE causes an ink droplet Ip of a certain volume corresponding to the volume reduction of the ink chamber 256 to be ejected from the nozzle Nz. In the state of an insufficient supply of ink into the ink chamber 256 to significantly retract the ink interface, on the other hand, application of a positive voltage to the piezoelectric element PE reduces the size of an ejected ink droplet. The color printer 200 of this embodiment regulates the waveform of the negative voltage applied to the piezoelectric element PE to vary the ink suction speed and thereby vary the size of an ink droplet ejected from the nozzle Nz. There are two variable-size dots, a large-size dot and a small-size dot, formed by the color printer 200 of the embodiment.

The two variable-size dots are only illustrative and not restrictive at all. The color printer may create three or any greater number of variable-size dots. In a modified structure of ejecting multiple small ink droplets simultaneously, the size of ink dots formed on the printing paper may be varied by regulating the number of ink droplets ejected simultaneously.

The color printer 200 having the hardware configuration discussed above actuates the carriage motor 230 to move the ink ejection heads 244 through 247 for the respective color inks in the main-scanning direction relative to the printing paper P, while actuating the paper feed motor 235 to feed the printing paper P in the sub-scanning direction. The control circuit 260 repeats main scans and sub-scans of the carriage 240 according to the input print data and actuates nozzles at adequate timings to eject ink droplets. The color printer 200 accordingly prints a resulting color image on the printing paper P.

C. Image Processing of First Embodiment

Figure 5:
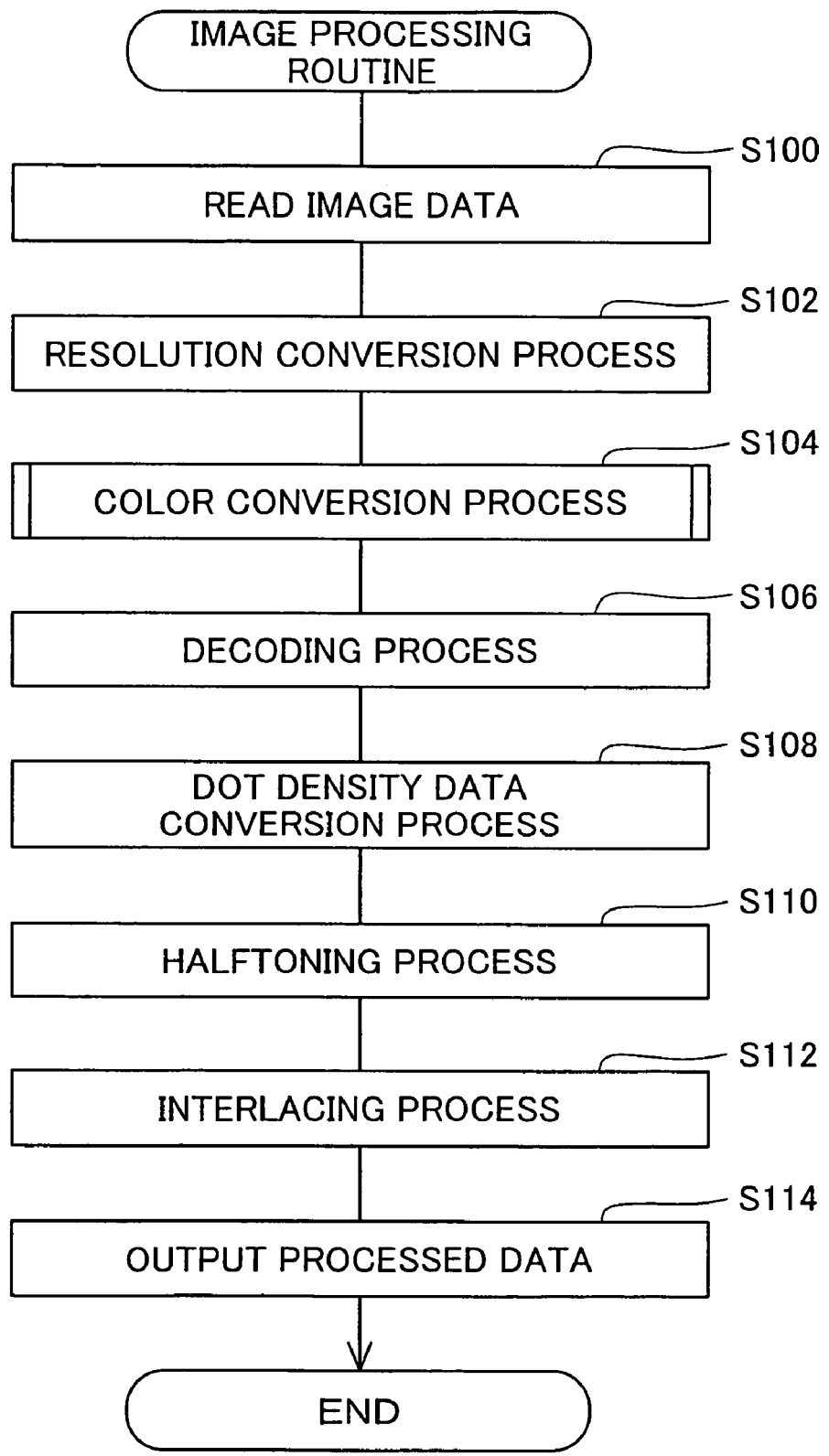
FIG. 5 is a flowchart showing an image processing routine executed by the image processing apparatus in a first embodiment.

FIG. 5 is a flowchart showing an image processing routine, which is executed by the computer 100 functioning as the image processing apparatus of the embodiment that subjects input image data to a series of image processing and thereby generates resulting print data. This image processing routine starts when the operating system of the computer 100 activates the printer driver 12.

When the image processing routine starts shown in FIG. 5, the printer driver 12 first reads RGB color image data as an object to be converted (step S100), and converts the resolution of the input RGB color image data into a printing resolution of the color printer 200 (step S102). When the resolution of the input color image data is lower than the printing resolution, the process performs linear interpolation to generate new data between existing adjacent image data. When the resolution of the input color image data is higher than the printing resolution, on the contrary, the process skips existing image data at a preset ratio to convert the resolution of the image data into the printing resolution.

After conversion of the resolution, the printer driver 12 carries out a color conversion process of the input color image data (step S104). As mentioned previously, the color conversion process changes the color system of the color image data and converts color image data expressed by combinations of tone values R, G, and B into image data in the CMY color system. The color printer 200 has the four color inks C, M, Y, and K. The color conversion process thus converts the input RGB color image data into color image data expressed by combinations of tone values C, M, Y, and K as the image data in the CMY color system.

Figure 6A:
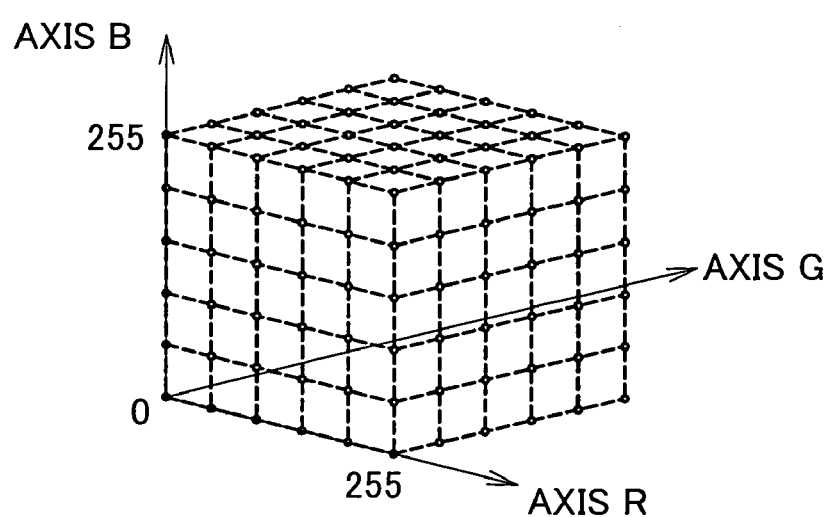
FIG. 6 shows a reference color conversion table (reference LUT) and an LUT reconstructed from the reference LUT.
Figure 6B:
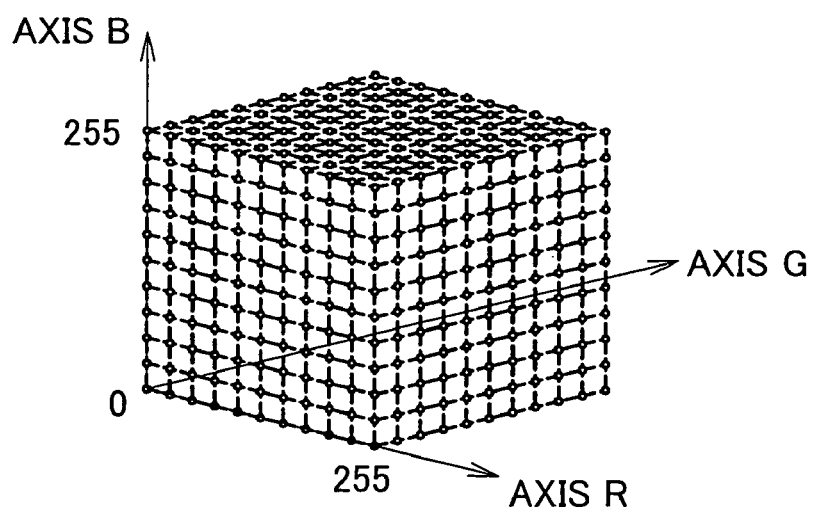
Figure 6C:
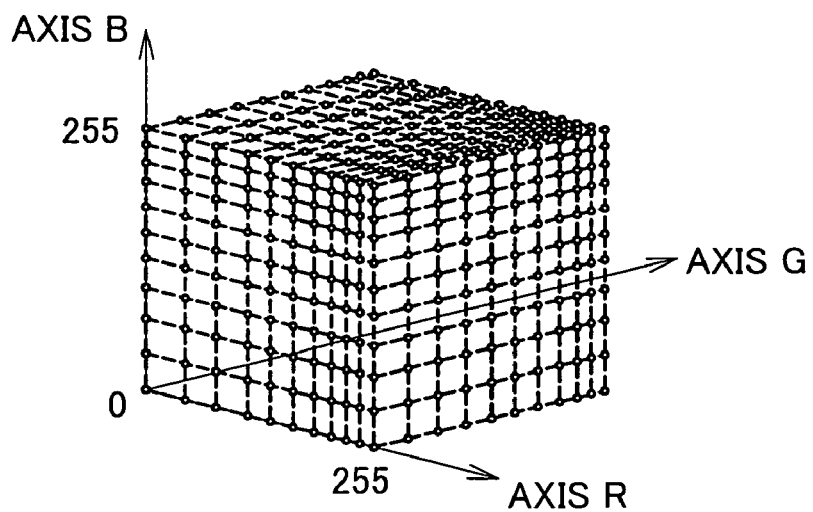

The color conversion process refers to a three-dimensional numerical table called a color conversion table (LUT). For accurate color conversion, the LUT is required to have a relatively large number of lattice points. Storage of the LUT including a large number of lattice points, however, occupies a large storage capacity. Selective use of different LUTs according to various printing conditions, for example, various types of printing papers, may be desirable in many cases. Storage of multiple LUTs further increases the required storage capacity. The structure of this embodiment accordingly adopts the technique of reconstructing the LUT. The embodiment stores a reference LUT including a less number of lattice points and supplements the reference LUT with an additional number of lattice points to reconstruct an LUT. FIG. 6(a) conceptually shows the reference LUT stored in the RAM 106 of the computer 100. Reconstruction of this reference LUT gives an LUT shown in FIG. 6(b). The LUT of FIG. 6(b) is reconstructed by supplementing the lattice points of the reference LUT with additional lattice points. This method is, however, not restrictive. Another applicable method independently sets lattice points from those of the reference LUT. FIG. 6(c) conceptually shows an LUT constructed by this method.

Figure 7:
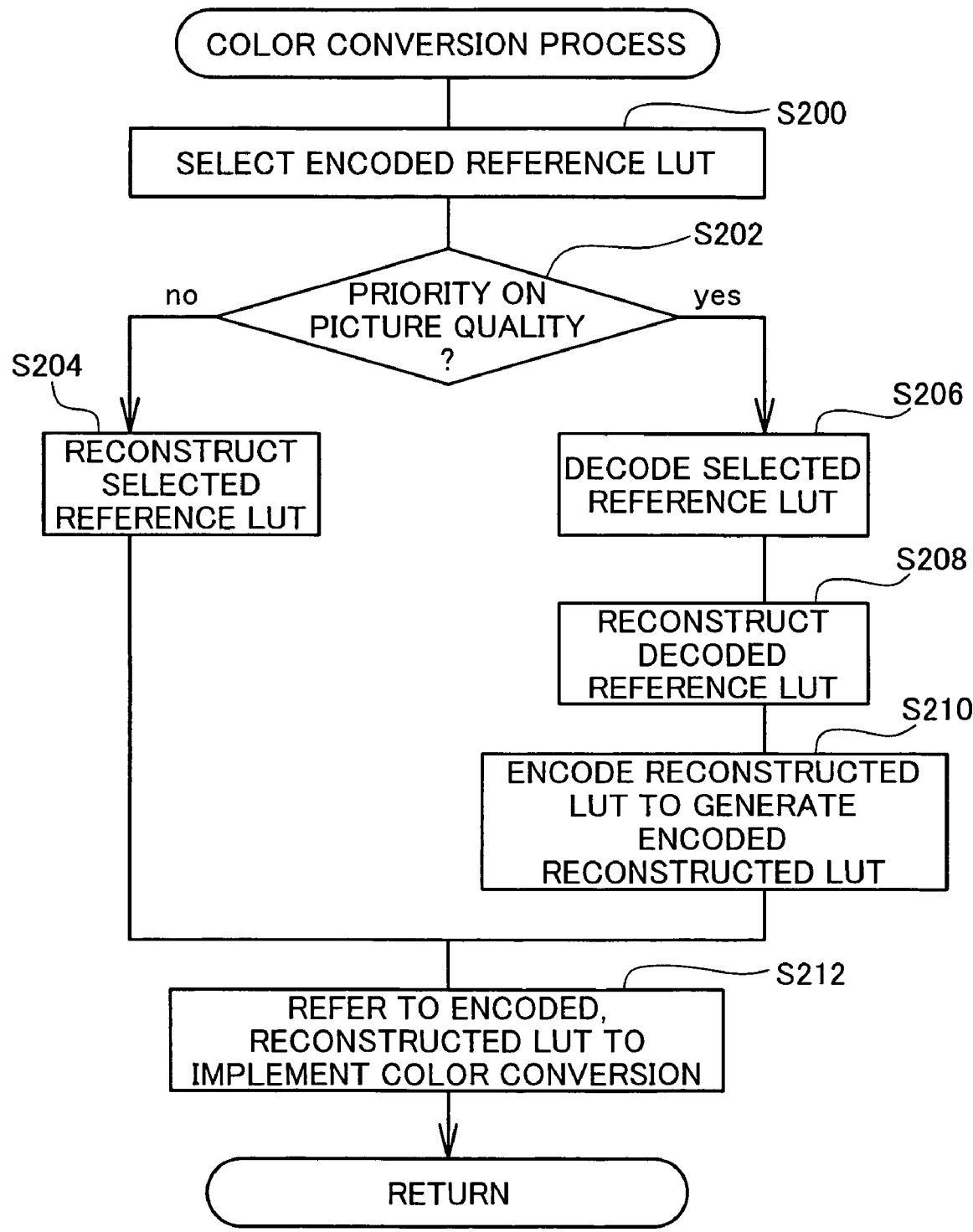
FIG. 7 is a flowchart showing the details of a color conversion process executed in the image processing routine of FIG. 5.

FIG. 7 is a flowchart showing the details of the color conversion process (step S104 in the flowchart of FIG. 5). When the color conversion process starts, the printer driver 12 first selects a reference LUT (step S200). It is desirable to selectively use an adequate LUT (color conversion table) according to the printing conditions, for example, the type of inks and the type of printing paper. Multiple reference LUTs corresponding to various printing conditions are thus stored in the RAM 106 of the computer 100. The printer driver 12 thus first selects one LUT to be used for color conversion in the color conversion process of FIG. 7.

Figure 8:
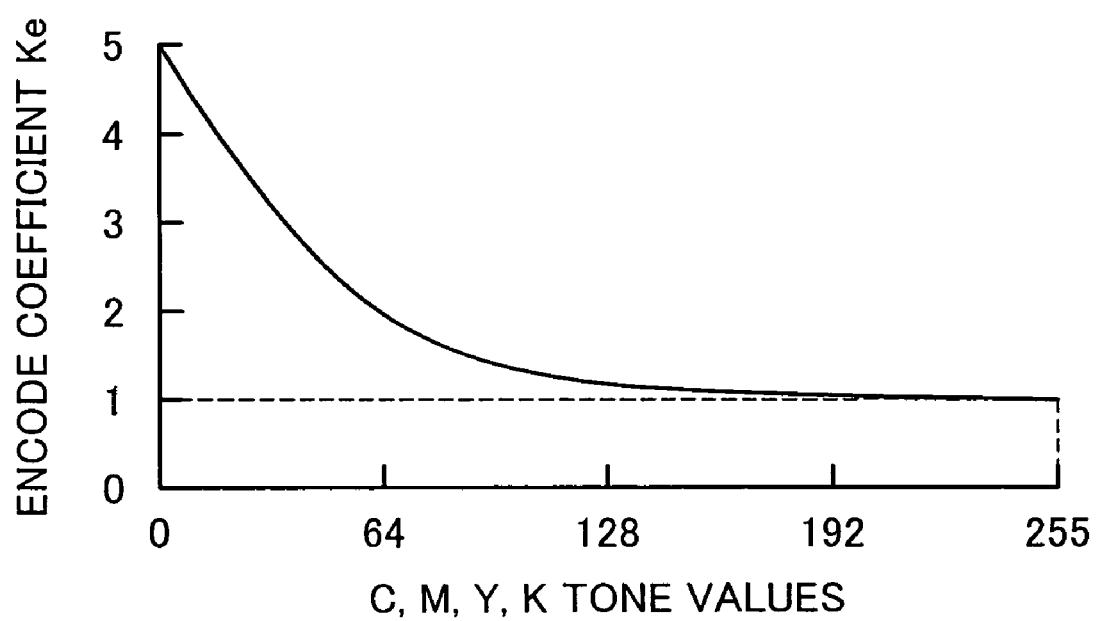
FIG. 8 shows an example of settings of an encode coefficient.

The reference LUT has been encoded in advance. The tone values of the respective colors C, M, Y, and K multiplied by preset values of an encode coefficient are stored at the respective lattice points. FIG. 8 shows an example of the settings of the encode coefficient. The encode coefficient is set appropriately to vary with a variation in tone values of the image data and to have a greater value in an area of higher accuracy. In this embodiment, the encoding process multiplies the respective tone values by the preset values of the encode coefficient. The encoding process is, however, not restricted to simple multiplication of the tone values by the preset values of the encode coefficient. One modified procedure of the encoding process may convert the image data according to a predetermined function of the tone values of the image data as variables.

The printer driver 12 then determines whether the settings of the printing conditions have priority on the picture quality (step S202). When the settings of the printing conditions do not have priority on the picture quality (step S202: No), the printer driver 12 directly reconstructs the selected reference LUT (step S204). As described previously with reference to FIG. 6, the LUT is reconstructed by linear interpolation of image data of the respective colors C, M, Y, and K at preset additional lattice points, based on the tone values set at the existing lattice points in the reference LUT. The reference LUT has been encoded in advance. Simple reconstruction of the LUT accordingly gives an encoded, reconstructed LUT. The printer driver 12 subsequently refers to the resulting encoded, reconstructed LUT and converts the RGB image data into CMYK image data (step S212). This flow readily generates the encoded, reconstructed LUT by simple reconstruction of the reference LUT, thereby attaining the high-speed color conversion.

Figure 9:
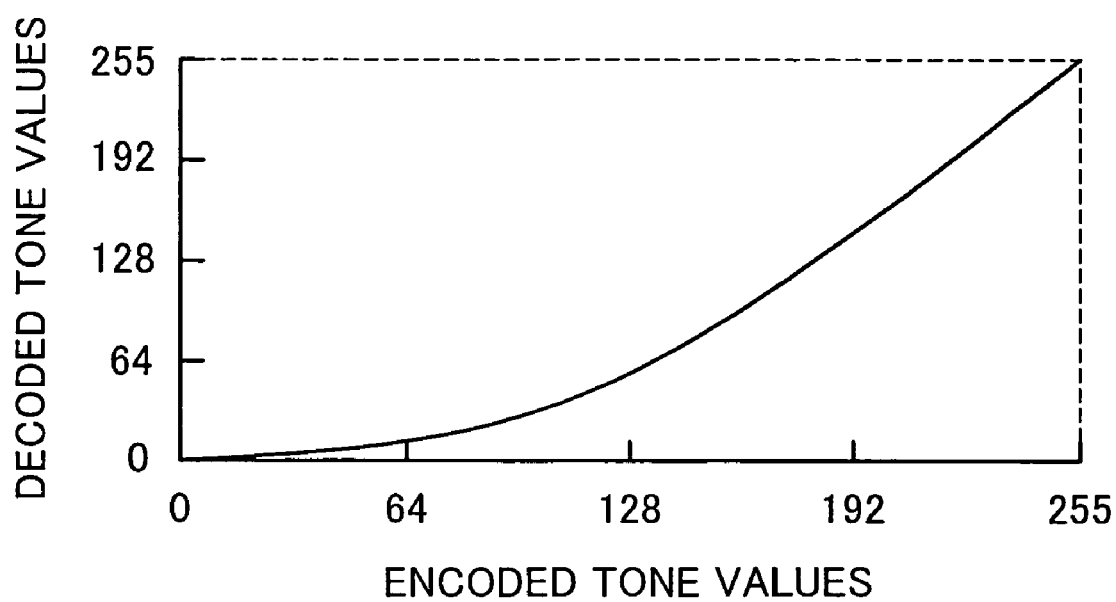
FIG. 9 shows one example of decoding conversion table.

In some cases, however, the simple reconstruction of the encoded reference LUT may lower the accuracy of color conversion, as mentioned above. When the settings of the printing conditions have priority on the picture quality (step S202: Yes), reconstruction of the LUT follows the method discussed below. The printer driver 12 first decodes the reference LUT selected at step S200 (step S206). The decoding process corresponds to inverse transformation of the encoding process and refers to a decoding conversion table to quickly decode the reference LUT. FIG. 9 shows one example of the decoding conversion table. The decoding conversion table stores tone values of image data mapped to decoded tone values, which are obtained by decoding the tone values of the image data. The processing of step S206 reads the encoded C, M, Y, and K color image data, which are stored at respective lattice points in the reference LUT, and refers to the decoding conversion table as shown in FIG. 9 to decode the reference LUT.

Figure 10:
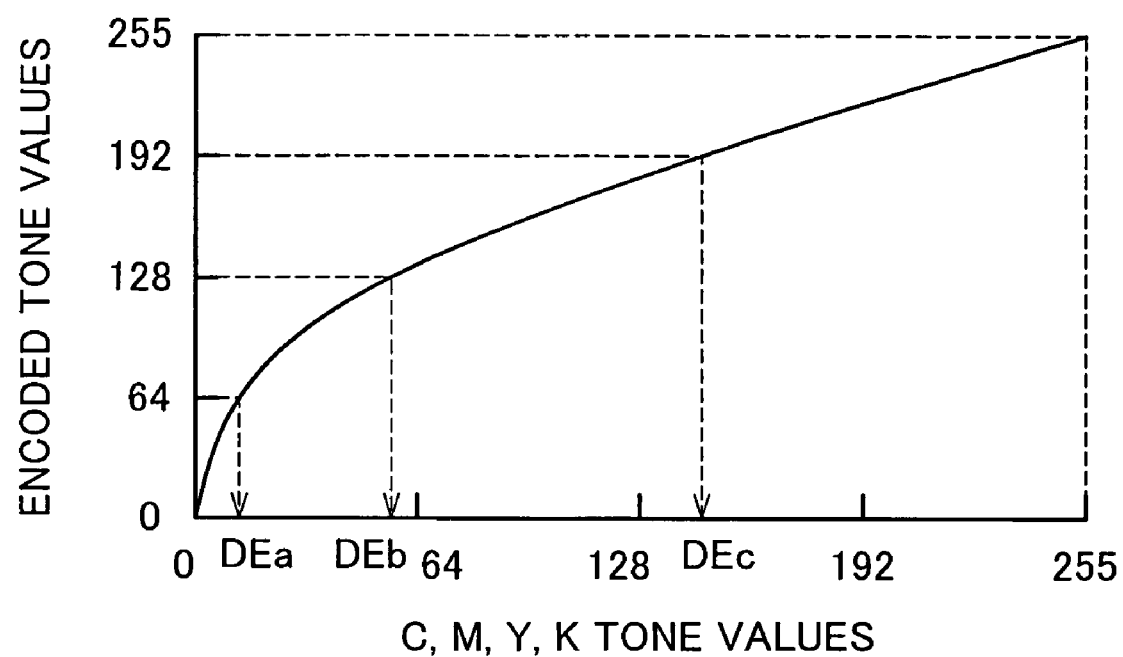
FIG. 10 shows a map of tone values to encoded tone values.

The decoding conversion table shown in FIG. 9 may be set according to the following simple method. The procedure first specifies a mapping of tone values of image data to encoded tone values, which are obtained by encoding the tone values of the image data. FIG. 10 shows a map of tone values of image data to encoded tone values, which are obtained by multiplying the tone values by the preset values of the encode coefficient shown in FIG. 8. The map of FIG. 10 has the tone values prior to the encoding process plotted as abscissa and the encoded tone values plotted as ordinate. The decoding process reconverts the encoded tone values to the tone values prior to the encoding process. The decoding process reads the map of FIG. 10 and finds the tone value prior to the encoding process corresponding to each encoded tone value on the ordinate axis. For example, the decoding process finds a tone value DEa prior to the encoding process corresponding to an encoded tone value '64', a tone value DEb prior to the encoding process corresponding to an encoded tone value '128', and a tone value DEc prior to the encoding process corresponding to an encoded tone value '192'. The procedure specifies the mapping of the tone values prior to the encoding process, that is, the decoded tone values, to the encoded tone values and stores the specified mapping as the decoding conversion table shown in FIG. 9.

The decoding conversion table shown in FIG. 9 is not required to have decoded tone values set corresponding to all the tone values. The decoding conversion table may store decoded tone values set corresponding to multiple discrete tone values. The decoding process specifies any required decoded tone values by interpolation. This arrangement desirably saves the storage capacity for storing the decoding conversion table.

When the encoding process does not multiply the tone values by the preset values of the encode coefficient but uses the function of the tone values as variables and an inverse function is obtainable by an analytical technique, the decoding process may substitute the encoded tone values in the inverse function.

Referring back to the flowchart of FIG. 7, after decoding of the selected reference LUT (step S206), the printer driver 12 reconstructs the decoded reference LUT (step S208). Linear interpolation of the reference LUT shown in FIG. 6(a) generates a reconstructed LUT including additional lattice points as shown in FIG. 6(b) or FIG. 6(c).

After reconstruction of the LUT, the printer driver 12 multiplies the tone values of the colors C, M, Y, and K at the respective lattice points by the preset values of the encode coefficient shown in FIG. 8 to generate an encoded, reconstructed LUT (step S210).

The printer driver 12 then refers to this encoded, reconstructed LUT and converts the RGB image data into CMYK image data (step S212). The use of this encoded, reconstructed LUT effectuates highly accurate color conversion as discussed later.

Referring back to the flowchart of FIG. 5, the processing of step S104 generates the reconstructed LUT from the selected reference LUT and refers to this reconstructed LUT to implement color conversion of the RGB image data as described above.

The image data obtained by the color conversion have been encoded. The image processing routine of this embodiment accordingly carries out a decoding process, subsequent to the color conversion process (step S106). The decoding process is readily implemented by referring to the decoding conversion table as described above.

On conclusion of the decoding process, the image processing routine starts a dot density data conversion process (step S108). The dot density data conversion process converts image data into dot density data representing dot densities of various dots, which are recordable on the printing paper by the printer. As mentioned previously, the color printer 200 of this embodiment is capable of forming two variable-size dots, the small-size dot and the large-size dot. The dot density data conversion process of step S108 accordingly converts the color-converted, decoded image data into dot density data representing dot densities of the two variable-size dots, the small-size dot and the large-size dot, with respect to each of the four colors C, M, Y, and K. A concrete procedure of the dot density data conversion process refers to a dot density table as shown in FIG. 11.

Figure 11:
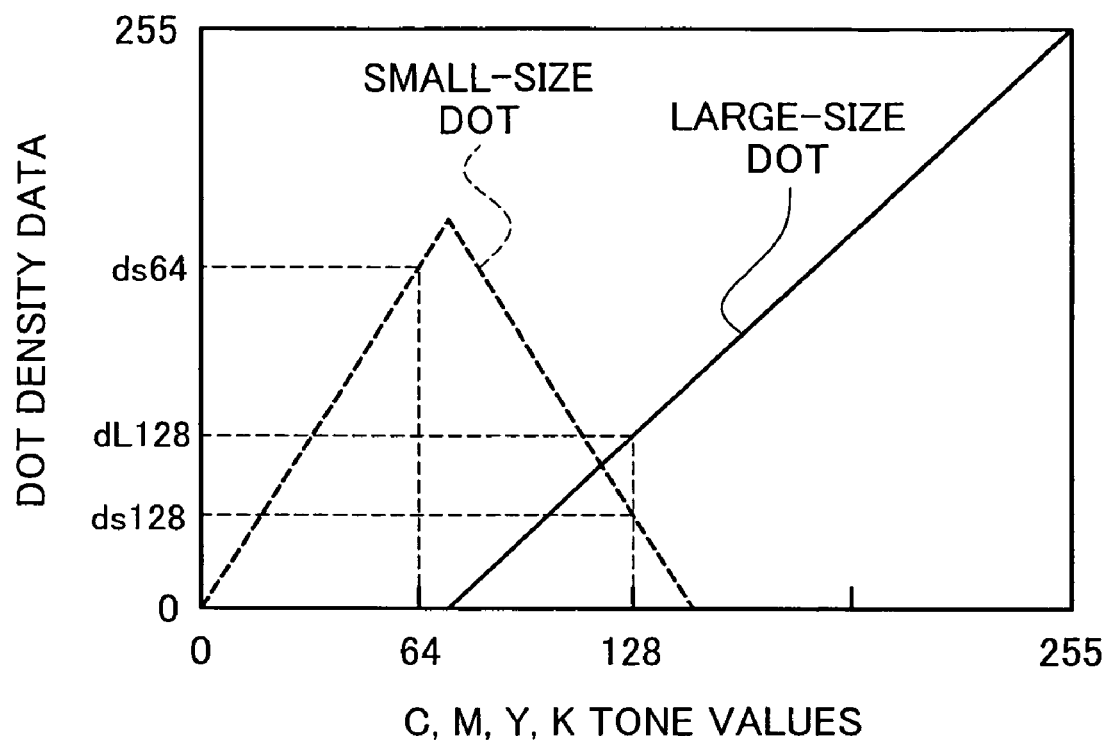
FIG. 11 shows a process of referring to a dot density table to convert image data into dot density data.

As shown in FIG. 11, the dot density table sets the dot density data representing the dot densities of the small-size dot and the large-size dot against the tone value with respect to each of the four colors C, M, Y, and K. Here the dot density represents a density of dots formed in pixels in a preset area. For example, values '0', '128', and '255' of the dot density data respectively represent a state of no formation of dots in any pixels, a state of formation of dots in approximately half pixels, and a state of formation of dots in all pixels.

The dot density table is set corresponding to the tone values of the respective colors. The description regards conversion of the tone value of the color C as an example. When the input tone value is equal to '0', the value of the dot density data is set equal to '0' with regard to both the small-size dot and the large-size dot. When the value of the dot density data is equal to '0', no dots are formed in any pixels. Namely the ground color (generally white) is kept intact on the printing paper. With an increase in input tone value, the dot density of the small-size dots gradually increases and the color expressed on the printing paper is changed from the ground color of the paper to cyan. When the input tone value reaches and exceeds a predetermined first level, the dot density of the small-size dots turns into a decrease and formation of the large-size dots starts to replace the small-size dots. Replacement of the small-size dots with the large-size dots gradually changes the color expressed on the printing paper to dark cyan. When the input tone value reaches a predetermined second level, all the small-size dots have been replaced with the large-size dots. The dot density of the large-size dots increases with a further increase in input tone value and eventually reaches the value '255', where the large-size dots are formed in all the pixels. In this manner, the dot density table is set to gradually change the color expressed on the printing paper to dark cyan with an increase in input tone value. The processing of step S108 in the flowchart of FIG. 5 refers to this dot density table and converts the color-converted, decoded image data into dot density data of the small-size dot and the large-size dot with respect to each of the C, M, Y, and K colors.

After completion of the color conversion process and the dot density data conversion process as described above, the printer driver 12 starts a halftoning process (step S110). The color conversion process and the dot density data conversion process have converted the input RGB image data into the dot density data representing the dot densities of the small-size dot and the large-size dot to be formed on the printing paper with respect to each of the C, M, Y, and K colors. The dot density data are expressed to have 256 tones in a range of '0' to '255'. The color printer 200 of the embodiment is, on the other hand, capable of forming only the two variable-size dots, the large-size dot and the small-size dot, with respect to each color. Each variable-size dot accordingly takes only either of two states, 'dot formation' and 'no dot formation'. The dot density data having 256 tones with respect to each variable-size dot are thus to be converted into image data expressed in only 2 tones, which are expressible by the color printer 200. Such conversion of the number of tones is called the halftoning process. The error diffusion technique is generally applied for the halftoning process, although any other known technique, such as the systematic dither technique, is also applicable for the halftoning process.

On completion of the halftoning process, the printer driver 12 starts an interlacing process (step S112). The interlacing process rearranges the processed image data representing the state of dot formation or no dot formation in an order to be transferred to the color printer 200 by taking into account the order of dot formation. The printer driver 12 then outputs resulting image data rearranged by the interlacing process as print data to the color printer 200 (step S114). The color printer 200 forms dots of the respective color inks on a printing medium according to the received print data. A color image corresponding to the image data is thus printed on the printing medium.

As described above, the image processing routine of this embodiment stores encoded reference LUTs. When the settings of the printing conditions do have priority on picture quality, the procedure directly reconstructs a selected reference LUT to generate an encoded, reconstructed LUT. This allows for high-speed color conversion and desirably shortens the total time required for image processing, thus attaining quick printing of images. The encoded, reconstructed LUT is used for color conversion. This arrangement ensures color conversion of the sufficient accuracy in response to standard requirements and prints images of the sufficient picture quality.

When the settings of the printing conditions have priority on picture quality, the procedure decodes a selected reference LUT, reconstructs the decoded reference LUT, and encodes the reconstructed LUT to generate an encoded, reconstructed LUT. The use of the resulting encoded, reconstructed LUT ensures color conversion with extremely high accuracy. This arrangement prints images of the remarkably high picture quality in response to requirements of high picture quality.

The technique of the embodiment ensures the high picture quality, because of the reasons discussed below. The use of a simple reconstructed LUT from a reference LUT, which stores encoded image data, may lower the accuracy of color conversion. The present invention has been completed by elucidating the mechanism of this lowering of the color conversion accuracy. The following discussion first regards the principle of enhancing the accuracy of color conversion by the encoding process (the principle of the encoding process) and then the reason why simple reconstruction of the encoded reference LUT may lower the accuracy of color conversion (the mechanism of the occurrence of a color shift)

D. Principle of Encoding Process

Figure 15A:
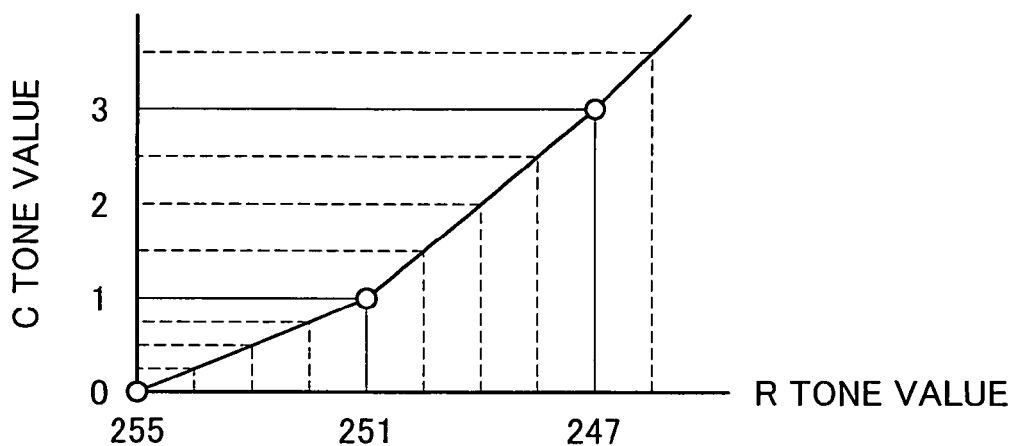
FIG. 15 shows the principle of compensating for an insufficiency of resolution by an encoding process.

FIG. 15 shows the principle of enhancing the accuracy of color conversion by the encoding process. For the simplicity of explanation, it is assumed that color image data expressed by combinations of tone values of the R, G, and B colors are converted into color image data expressed by combinations of tone values of the C, M, and Y colors. FIG. 15(a) conceptually shows tone values of the respective C, M, and Y colors stored at lattice points in a reference LUT. As described above, the LUT is regarded as a three-dimensional numerical table including the tone values of the respective colors R, G, and B as entries. For the simplicity of illustration, here it is assumed that only the R tone value is varied, while both the G tone value and the B tone value are kept to fixed values (=255). Under such conditions, the LUT of the three-dimensional numerical table is expressible in a two-dimensional graph as described below. In this illustrated example, the LUT is expressed by 1-byte data.

The RGB image data having all the R, G, and B tone values equal to '255' expresses white in color. The image data stored at the corresponding lattice point in the LUT accordingly has all the C, M, and Y tone values equal to '0'. While the G tone value and the B tone value are kept to '255', only the R tone value is gradually decreased. The color expressed by the RGB image data then gradually changes from white to cyan. Only the C tone value out of the image data stored at the lattice point in the LUT accordingly increases, while the M tone value and the Y tone value are kept to '0'. Namely a variation of only the R tone value out of the RGB image data under the conditions of the fixed G tone value and B tone value to '255' varies only the C tone value out of the CMY image data, while keeping the M tone value and the Y tone value to '0'. Under such conditions, the LUT of the three-dimensional numerical table is expressible as a two-dimensional graph.

FIG. 15(a) accordingly shows a reference LUT as a two-dimensional graph, where open circles represent lattice points in the LUT. In the graph of FIG. 15(a), C tone values '0', '1', and '3' are respectively stored at lattice points of R tone values '255', '251', and '247'. Data between the lattice points are calculated by interpolation. For example, such calculation gives a C tone value '0.25' corresponding to an R tone value '254' and a C tone value '0.5' corresponding to an R tone value '243'. The reference LUT does not include a large number of lattice points as mentioned above. In most cases, interpolation of existing data between adjoining lattice points enables RGB image data to be converted into CMY image data with sufficient accuracy.

Figure 15B:
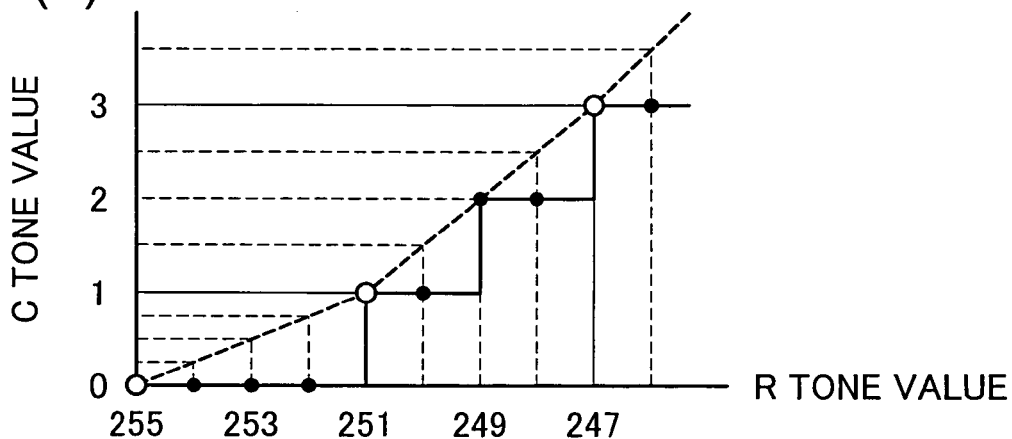

A new LUT is reconstructed from the reference LUT shown in FIG. 15(a). The reference LUT of FIG. 15(a) has the lattice points corresponding to every 3 other R tone values from the maximum level, that is, the R tone values '255', '251', and '247'. The new LUT is reconstructed by adding three lattice points between each existing pair of lattice points. FIG. 15(b) conceptually shows the reconstructed LUT, where closed circles represent newly added lattice points. For example, interpolation determines a C tone value as '0.25' at a lattice point of an R tone value '254'. The LUT is, however, expressed by 1-byte data. The tone value '0.25' obtained by interpolation is accordingly rounded to a tone value '0' when the tone value is written at the lattice point in the reconstructed LUT. The same problem arises at a lattice point of an R tone value '250'. Interpolation determines a C tone value as 1.5 at the lattice point of the R tone value '250'. This calculation result is, however, rounded to a tone value '1' when the tone value is written at the lattice point in the reconstructed LUT. Simple reconstruction of the reference LUT accordingly gives a reconstructed LUT of solid line shown in FIG. 15(b). As clearly understood from this fact, when the image data stored in the LUT do not have sufficient resolution, the reconstructed LUT includes errors due to rounding of values and lowers the accuracy of color conversion.

This problem is found not only in the case of the insufficient resolution of the image data stored in the LUT but in the case of insufficient accuracy of data processed by color conversion (for example, when the image data is treated as 1-byte data through the color conversion process).

Figure 15C:
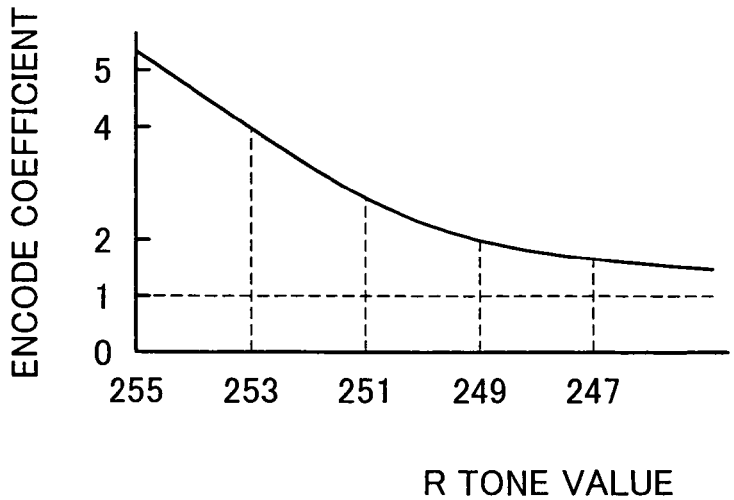

Such drawbacks are readily eliminated by encoding. The encoding process specifies tone values of new lattice points by interpolation, multiplies the calculated tone values by preset values of the encode coefficient, and writes the encoded tone values into the reconstructed LUT. FIG. 15(c) shows an example of the settings of the encode coefficient. The encode coefficient is set approximate to 4 in the vicinity of an R tone value '253'. As mentioned above with reference to FIG. 15(b), the C tone value varies by 0.25 with a variation in R tone value by 1 in the vicinity of the R tone value '253'. This variation is significantly small relative to the resolution of the LUT and is thus not sufficiently reflected on the data actually written in the LUT. Multiplication of the calculated tone value by the encode coefficient expands the variation in C tone value to a value of approximately '1'. The expanded variation in C tone value with a variation in R tone value can be reflected on the data actually written at the lattice points in the LUT.

The encoding process has similar effects on the image data in the vicinity of an R tone value '249'. As mentioned above with reference to FIG. 15(b), the C tone value varies by 0.5 with a variation in R tone value by 1 in the vicinity of the R tone value '249'. This variation '0.5' of the tone value is, however, rather small relative to the resolution of the LUT. The C tone value calculated by interpolation is multiplied by the preset value of the encode coefficient. As shown in FIG. 15(c), the encode coefficient is set approximate to 2 in the vicinity of the R tone value '249'. Multiplication of the calculated tone value by the encode coefficient approximately doubles the variation in C tone value. The doubled variation in C tone value with a variation in R tone value can be reflected on the data actually written at the lattice points in the LUT.

The method of setting appropriate values of the encode coefficient according to the required resolution and reconstructs the LUT with the encoded tone values. The variation in tone value of the input image data is then well reflected on the reconstructed LUT. The color-converted, encoded image data go through the decoding process at an adequate timing. The encoding process accordingly ensures color conversion of input color image data with high accuracy.

E. Mechanism of Occurrence of Color Shift

The following describes why reconstruction of an encoded reference LUT may lower the accuracy of color conversion, regardless of the encoding process. This mechanism has been found by the inventors of the present invention.

Figure 16A:
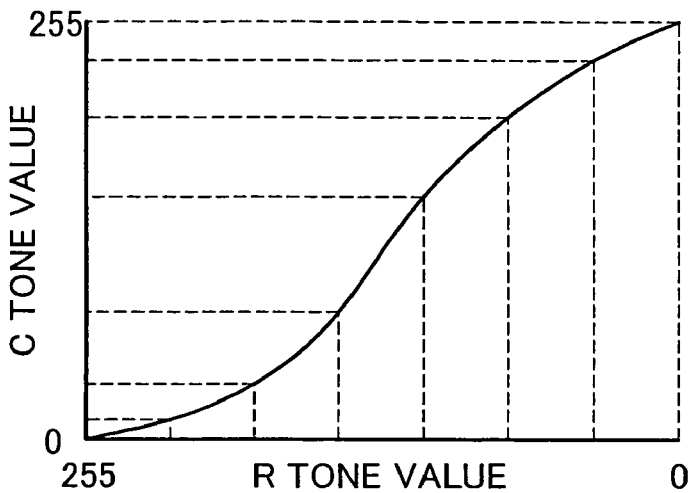
FIG. 16 shows the mechanism of lowering the accuracy of color conversion by reconstruction of an encoded reference LUT.
Figure 16B:
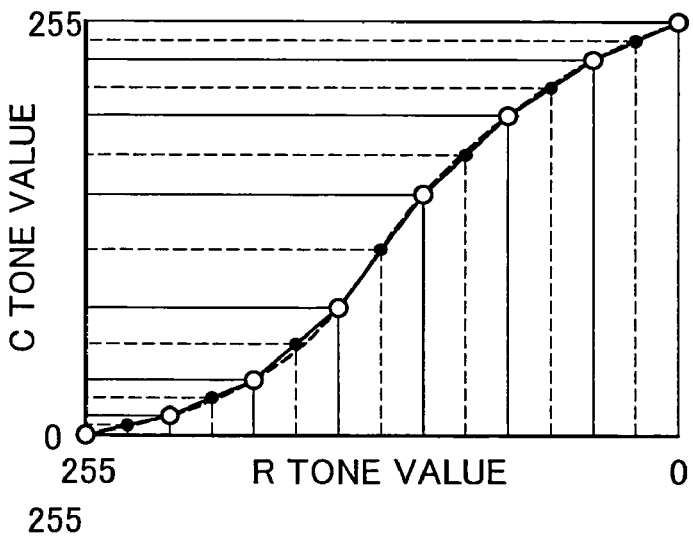

FIG. 16 shows the reason why reconstruction of an encoded reference LUT may cause a color shift. As in the case of FIG. 15, the LUT is expressed as a two-dimensional graph in FIG. 16 by varying only the R tone value while keeping both the G tone value and the B tone value to the fixed value '255'. FIG. 16(a) conceptually shows a variation in output C tone value with a variation in input R tone value under application of ideal color conversion. FIG. 16(b) conceptually shows a reference LUT representing such a map of the R tone value to the C tone value. Open circles in FIG. 16(b) represent lattice points set in the reference LUT. The color conversion process reconstructs a new LUT from the reference LUT and refers to the reconstructed LUT to convert the color system of image data. The new LUT is reconstructed by adding one new lattice point in the middle of each existing pair of lattice points in the reference LUT. Closed circles in FIG. 16(b) represent newly added lattice points. The C tone value of each newly added lattice point is calculated by interpolation of the C tone values at the adjoining lattice points in the reference LUT, which are located on both sides of the newly added lattice point.

For the purpose of reference, a curved, dashed line is given in FIG. 16(b) to represent a map of the R tone value to the C tone value (a color conversion characteristic curve) under application of ideal color conversion. The closed circles are all located in the vicinity of this curved, dashed line. Color conversion with reference to the reconstructed LUT accordingly gives equivalent results to those obtained by the ideal color conversion. When the reconstructed LUT has some rounding errors due to the insufficient resolution, the encoding process is carried out as described above to ensure color conversion with sufficient accuracy.

Figure 16C:
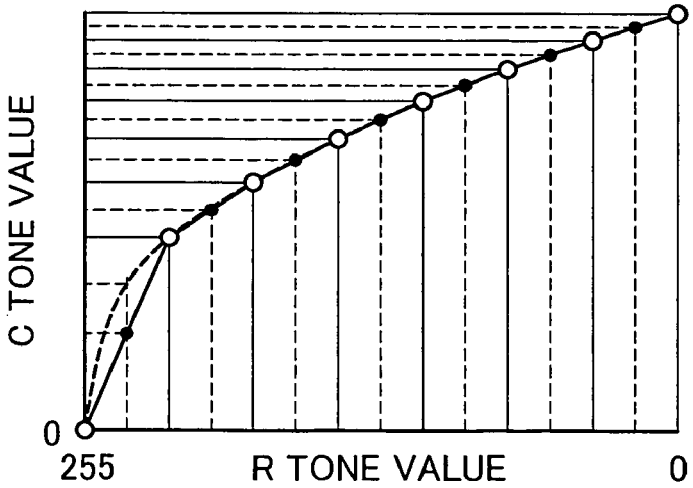

FIG. 16(c) shows an encoded reference LUT. Open circles in FIG. 16(c) represent lattice points in the encoded reference LUT, which is obtained by encoding the reference LUT shown in FIG. 16(b). The C tone value stored at each lattice point in the encoded reference LUT of FIG. 16(c) is obtained by multiplying the C tone value stored at the corresponding lattice point in the reference LUT of FIG. 16(b) by the preset value of the encode coefficient. The color conversion process adds new lattice points between the respective existing pairs of lattice points in the encoded reference LUT and calculates the C tone values of the newly added lattice points by interpolation to reconstruct an LUT. Closed circles in FIG. 16(c) represent lattice points newly added in the process of reconstruction of the encoded reference LUT. A curved, dashed line shown in FIG. 16(c) represents a color conversion characteristic curve obtained by encoding the mapping of the ideal color conversion shown in FIG. 16(a). As clearly understood from FIG. 16(c), the LUT reconstructed from the encoded reference LUT may have a significant deviation at part of lattice points from the encoded ideal color conversion characteristic curve. Such a deviation is not always made, but is often found in an area having a significant variation in encoded tone value relative to the interval between adjoining lattice points set in the reference LUT. As described above, multiplication by the encode coefficient expands the variation in tone value. The potential for the deviation is thus heightened in the area having a large gradient of the encode function between the adjoining lattice points.

As described above, the LUT reconstructed from the encoded reference LUT may have a deviation from the ideal color conversion characteristic. The use of such a reconstructed LUT with a deviation lowers the accuracy of color conversion and causes a color shift, regardless of the encoding process.

The technique of the invention adequately reconstructs an LUT even from an encoded reference LUT to ensure highly accurate color conversion. This technique is discussed below with reference to FIG. 17.

F. Principle of Accuracy Enhancement

The image processing apparatus and the image processing method of the invention uses a color conversion table, which stores a mapping of image data in a first color system to image data in a second color system. The color conversion table has been encoded in advance. Decoding this color conversion table gives an intermediate color conversion table (intermediate table) as discussed below with reference to FIG. 17.

Figure 17A:
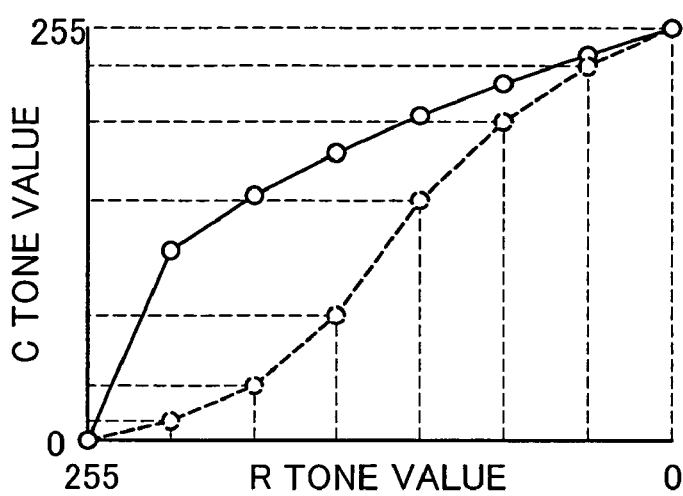
FIG. 17 shows the principle of effectively preventing a decrease in accuracy of color conversion by decoding an encoded reference LUT and reconstructing the decoded LUT.

FIG. 17(a) shows an encoded color conversion table and an intermediate color conversion table (intermediate table) generated by decoding the encoded color conversion table. A curve of solid line conceptually shows the encoded color conversion table. Open circles on the solid-line curve conceptually show storage of encoded C tone values against R tone values at respective lattice points in the encoded color conversion table. The encoded color conversion table shown in FIG. 17(a) is identical with the color conversion table of FIG. 16(c). Decoding of this color conversion table gives the intermediate table shown by a curved, dashed line in FIG. 17(a). Decoded C tone values, which are obtained by decoding the C tone values stored at the lattice points of the open circles in the encoded color conversion table, are stored at respective lattice points in the intermediate table. Open circles of the dashed line on the curved, dashed line conceptually show storage of the decoded C tone values at the respective lattice points in the intermediate table.

The color conversion process then refers to the intermediate table and specifies second image data at multiple lattice points, which are set to include at least lattice points different from those set in the intermediate table. The intermediate table is reconstructed with encoding of the specified second image data. The color conversion process refers to this reconstructed color conversion table and converts image data expressed in a first color system into image data expressed in a second color system. The variation in tone value of the original image data expressed in the first color system is well reflected on the resulting encoded image data with high accuracy, as described previously. Subsequent decoding of the encoded image data cancels out the encoding process and accordingly attains highly accurate color conversion of image data in the first color system into image data in the second color system, as discussed below with referent to FIG. 17.

Figure 17B:
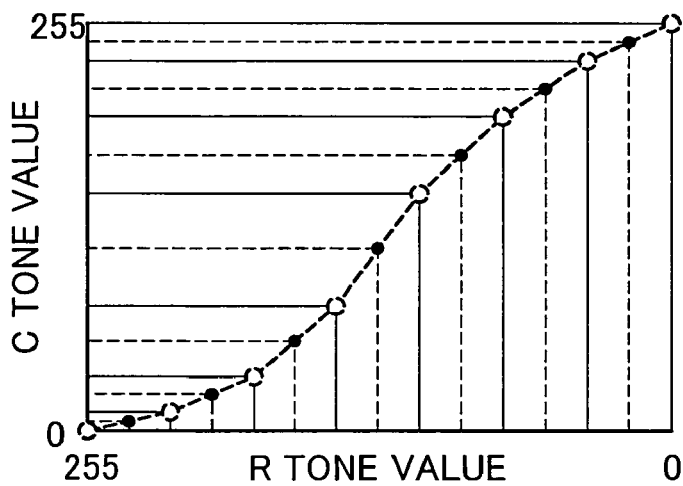
Figure 17C:
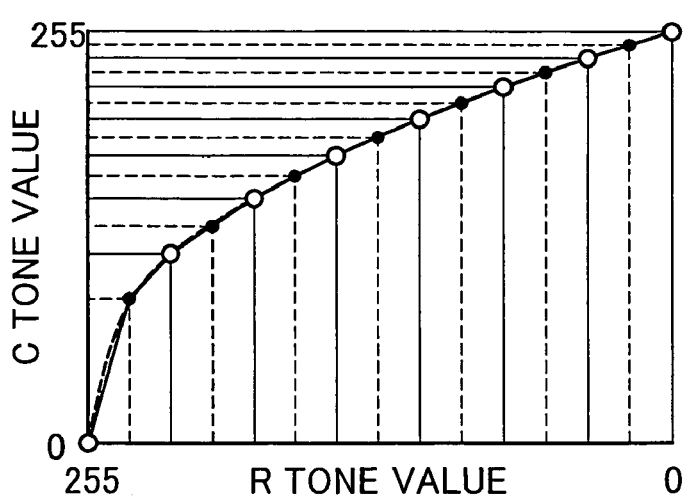

FIG. 17(b) conceptually shows a color conversion table obtained by reconstructing the intermediate table. In this reconstructed color conversion table, a new lattice point shown by a closed circle is added between each existing pair of lattice points in the intermediate table. Encoding of the reconstructed color conversion table gives an encoded color conversion table shown in FIG. 17(c). Open circles and closed circles in FIG. 17(c) represent lattice points in the encoded color conversion table. A curved, dashed line in FIG. 17(c) is a characteristic curve obtained by encoding the ideal color conversion characteristic. The encoded color conversion table obtained by reconstructing the intermediate table and encoding the reconstructed table well agrees with the characteristic curved, dashed line obtained by encoding the ideal color conversion characteristic as shown in FIG. 17(c). The process of color conversion with reference to this encoded color conversion table and subsequent decoding of resulting image data thus ensures accurate conversion of the color system of the image data.

G. Image Processing of Second Embodiment

The procedure of image processing in the first embodiment discussed above first decodes the color-converted, encoded image data and then converts the decoded image data into dot density data. Conversion of color-converted image data into dot density data is essential in the series of image processing executed by the printer driver 12. The decoding process and the dot density data conversion process may thus be carried out simultaneously. This arrangement is discussed below as image processing of a second embodiment.

Figure 12:
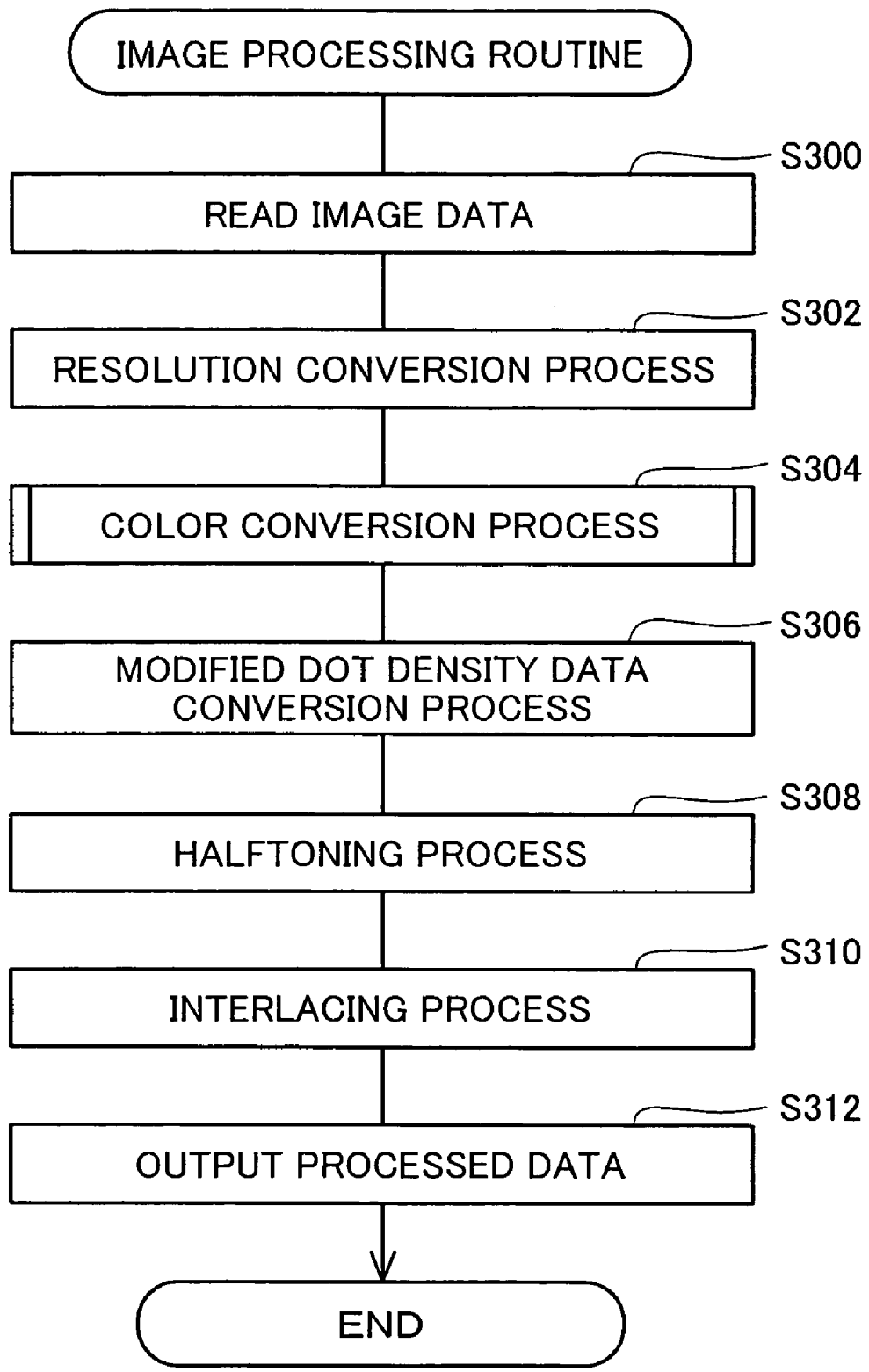
FIG. 12 is a flowchart showing an image processing routine executed by the image processing apparatus in a second embodiment.

FIG. 12 is a flowchart showing an image processing routine executed in the second embodiment. The primary difference from the image processing routine of the first embodiment is that the image processing routine of the second embodiment simultaneously carries out the decoding process and the dot density data conversion process as an integral step. The image processing of the second embodiment is briefly described below, with a focus on the difference from the image processing of the first embodiment.

When the image processing routine of the second routine starts, the printer driver 12 first reads RGB color image data as an object to be converted (step S300) and converts the resolution of the input color image data into a printing resolution (step S302).

After the resolution conversion process, the printer driver 12 carries out the color conversion process (step S304) in the same manner as that in the image processing routine of the first embodiment. The color conversion process selects one reference LUT among multiple reference LUTs stored in the RAM 106 of the computer 100. Here the reference LUT has been encoded in advance, so that the process selects an encoded reference LUT. When the settings of the printing conditions do not have priority on picture quality, the color conversion process directly reconstructs the selected reference LUT to generate an encoded, reconstructed LUT. When the settings of the printing conditions have priority on picture quality, on the other hand, the color conversion process first decodes the encoded reference LUT, reconstructs the decoded LUT, and again encodes the reconstructed LUT, so as to generate an encoded, reconstructed LUT. The color conversion process refers to the resulting encoded, reconstructed LUT to convert the input RGB image data into image data of C, M, Y, and K colors.

The resulting image data have been encoded and thereby require a subsequent decoding process. Conversion of image data into dot density data is also required for the halftoning process. The image processing routine of the second embodiment accordingly carries out a modified dot density data conversion process to decode the image data simultaneously with conversion of the image data into dot density data (step S306).

Figure 13:
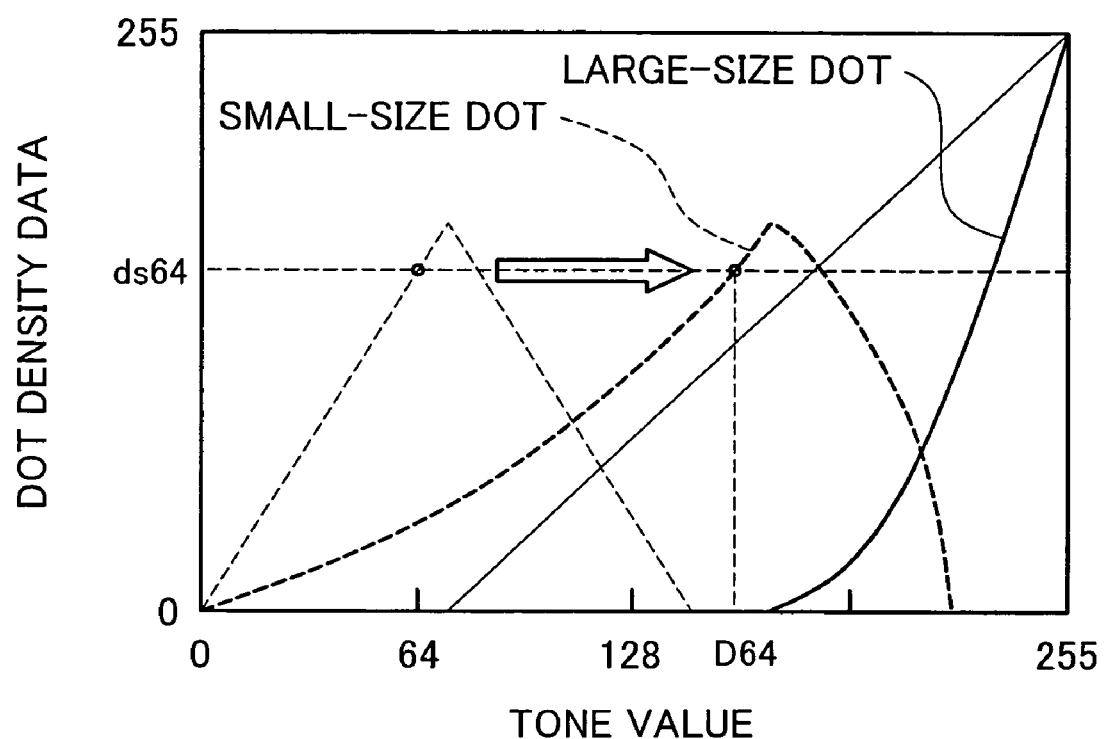
FIG. 13 shows the principle of modifying a dot density table to set a modified dot density table.

The modified dot density data conversion process is similar to the dot density data conversion process adopted in the first embodiment. The dot density data conversion process of the first embodiment refers to the dot density table shown in FIG. 11 to convert the image data into dot density data with respect to each of the four colors C, M, Y, and K. Similarly the modified dot density data conversion process of the second embodiment refers to a modified dot density table shown in FIG. 13 to convert the encoded image data into decoded dot density data. In the graph of FIG. 13, a thick curved, dashed line represents a modified dot density table with respect to the small-size dot, while a thick solid-line curve represents a modified dot density table with respect to the large-size dot. For the purpose of reference, the dot density table with respect to the small-size dot and the dot density table with respect to the large-size dot are shown by a thin dashed line and a thin solid line in FIG. 13. The modified dot density table converts image data into dot density data of smaller values, compared with the dot density table, as clearly shown in FIG. 13. In an area of small tone values, the data set in the modified dot density table of the second embodiment (shown by the thick dashed line) have smaller values than the data set in the dot density table of the first embodiment (shown by the thin dashed line). In an area of intermediate tone values (for example, in the vicinity of a tone value '100'), no dots are formed in the modified dot density table (shown by the thick solid line) with respect to the large-size dot, while the data set in the modified dot density table are greater than the data set in the dot density table with respect to the small-size dot. In this intermediate area, the modified dot density table accordingly gives dot density data of smaller values.

The modified dot density table of the second embodiment converts the image data into dot density data of smaller values, compared with the dot density table of the first embodiment. This is because the modified dot density data conversion process simultaneously implements decoding of the image data. Conversion of image data by referring to the adequately set modified dot density table simultaneously attains decoding of the image data. The method of adequately setting the modified dot density table will be discussed later.

When obtaining the dot density data with respect to each of the C, M, Y, and K colors, the printer driver 12 carries out the halftoning process (step S308) and the interlacing process (step S310) and outputs resulting processed data as print data to the color printer 200 (step S312). The color printer 200 forms the large-size dots and the small-size dots with regard to the C, M, Y, and K colors according to the received print data, so as to print a color image.

As described above, the procedure of the second embodiment refers to the modified dot density table shown in FIG. 13 to implement conversion of the image data into dot density data simultaneously with decoding of the image data. This arrangement desirably shortens the total time required for the series of image processing and thereby attains quick printing of images.

The following describes the method of setting the modified dot density table shown in FIG. 13. The description first regards the principle of setting the adequate modified dot density table with reference to FIG. 13 and then the actual process of setting the modified dot density table with reference to the flowchart of FIG. 14.

The modified dot density table of the second embodiment is readily obtained by modifying the dot density table of the first embodiment. The dot density table stores the settings of the dot density data of the small-size dot and the large-size dot against the C, M, Y, and K tone values of the image data. Here the image data of the C, M, Y, and K tone values have gone through the decoding process to cancel out the effects of the encoding process. The image data after cancellation of the encoding process (that is, the decoded image data) are convertible into dot density data by referring to the dot density table. For example, a tone value '64' of the image data is converted into dot density data 'ds64' with respect to the small-size dot according to the thin, dashed line of FIG. 13, while being converted into dot density data 0 with respect to the large-size dot according to the thin solid line of FIG. 13.

The encoding process multiplies the tone values of the image data by the preset values of the encode coefficient, as described previously. While the image data after cancellation of the encoding process (that is, the decoded image data) has the tone value '64', the encoded image data (that is, the image data prior to the decoding process) has a tone value 'D64' by multiplying the tone value '64' by the preset encode coefficient. Namely when the encoded image data has the tone value 'D64', decoding of this encoded image data gives the tone value '64'. According to the dot density table, this tone value '64' is converted into the dot density data 'ds64' with respect to the small-size dot and into the dot density data '0' with respect to the large-size dot.

As clearly understood from the above example, the modified dot density table is readily obtained by modifying the dot density table. The modification process first selects one tone value (the tone value '64' in the above example) on the abscissa in the dot density table and acquires dot density data corresponding to the selected tone value (the dot density data 'ds64' with respect to the small-size dot and the dot density data 101 with respect to the large-size dot in the above example). The modification process then multiplies the selected tone value by a preset value of the encode coefficient and stores the acquired dot density data ('ds64' and '0') as dot density data corresponding to the calculated tone value (the tone value 'D64' in the above example). The open arrow shown in FIG. 13 conceptually shows the process of modifying the dot density table to set the modified dot density table.

Figure 14:
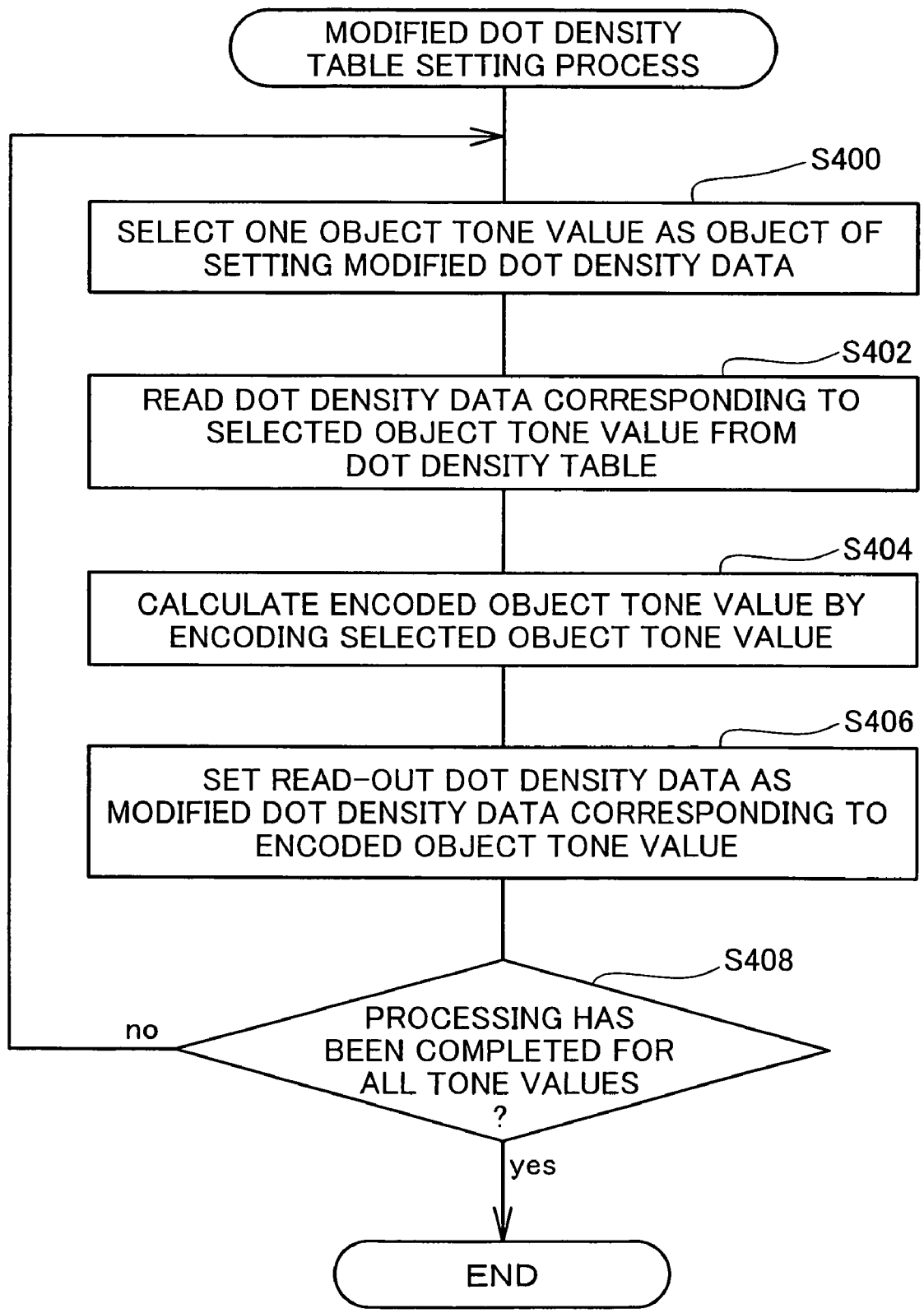
FIG. 14 is a flowchart showing a modified dot density table setting routine.

The description now regards the actual process of setting the modified dot density table. FIG. 14 is a flowchart showing a modified dot density table setting routine. The modified dot density table is set with respect to each of the four colors C, M, Y, and K, and the series of processing is executed for each color. For the simplicity of explanation, the following description does not specify the color.

When the modified dot density table setting routine starts, the printer driver 12 first selects an object tone value as an object, corresponding to which modified dot density data is set (step S400). The object tone value is a coordinate value on the abscissa in the modified dot density table of FIG. 13. In this embodiment, each tone value is expressed as 1-byte data. The object tone value accordingly takes an integral value in a range of 0 to 255. The printer driver 12 then reads dot density data corresponding to the selected object tone value from the dot density table and stores the dot density data (step S402).

After storage of the dot density data corresponding to the object tone value, the printer driver 12 calculates an encoded tone value by encoding the object tone value (step S404). The encoding process multiples the tone values by preset values of the encode coefficient. The processing of step S404 accordingly multiplies the object tone value by a preset value of the encode coefficient. The resulting encoded tone value is rounded to an integral value. The encoding process is not restricted to simple multiplication of the tone values by the preset values of the encode coefficient. One modified procedure of the encoding process may convert the image data according to a predetermined function of the tone values of the image data as variables.

The printer driver 12 then stores the dot density data read at step S402 as modified dot density data corresponding to the encoded object tone value calculated at step S404 (step S406).

On completion of setting the modified dot density data corresponding to one object tone value, it is determined whether modified dot density data have been set for all object tone values (step S408). When there are any non-processed tone values, the routine returns to step S400 and repeats the series of processing to conclude the processing for all the tone values. When the series of processing has been completed for all the tone values, this modified dot density table setting routine is terminated.

The image processing routine of the second embodiment shown in FIG. 12 refers to this modified dot density table to simultaneously implement decoding of the encoded image data with conversion of the image data into dot density data, thus attaining high-speed image processing.

The embodiments discussed above are to be considered in all aspects as illustrative and not restrictive. There may be many modifications, changes, and alterations without departing from the scope or spirit of the main characteristics of the present invention. For example, software programs (application programs) attaining the respective functions discussed above may be supplied to a main memory of a computer system or an external storage device via a communication line to be executed. The computer system may otherwise read and execute such software programs stored in a CD-ROM or a flexible disk.

In the embodiments discussed above, the series of image data conversion process including the halftoning process is executed by the computer. Part or all of the image data conversion process may alternatively be executed by a printer or any exclusive image processing apparatus.

The image display device is not restricted to the printing device that forms ink dots on a printing medium to print an image. Another available example of the image display device is a liquid crystal display device that disperses luminance spots at adequate densities on a liquid crystal display to express an image of continuously varying tones.

The scope and spirit of the present invention are indicated by the appended claims, rather than by the foregoing description.

What is claimed is:

1. An image processing apparatus that converts image data expressed in a first color system into image data expressed in a second color system, said image processing apparatus comprising:

a color conversion table storage module that stores a color conversion table representing a mapping of second image data expressed in the second color system to multiple lattice points, at which first image data generated in a color space of the first color system and expressed in the first color system are registered, wherein the color conversion table is encoded and represents a mapping of encoded second image data to the multiple lattice points, where the encoded second image data are obtained by an encoding process, which enhances a variation in tone value of the second image data in a predetermined tone area in the first color system while compressing the variation in tone value of the second image data in a residual tone area;

an intermediate table generation module that makes the color conversion table subjected to a decoding process, so as to generate an intermediate color conversion table, where the decoding process restores the variation in tone value enhanced or compressed by the encoding process;

a color conversion table reconstruction module that specifies second image data corresponding to multiple lattice points, which are set to include at least different lattice points from newly added lattice points as well as existing lattice points, which are both included in the intermediate color conversion table, based on the intermediate color conversion table and makes the specified second image data subjected to the encoding process, so as to reconstruct a color conversion table that is used for actual color conversion from the intermediate color conversion table and generate a reconstructed color conversion table;

a color conversion module that refers to the reconstructed color conversion table to convert the image data expressed in the first color system into encoded image data, which has gone through the encoding process; and an image data decoding module that makes the encoded image data subjected to the decoding process to cancel out the encoding process, thus specifying the image data expressed in the second color system.

2. An image processing apparatus in accordance with claim 1, wherein said color conversion table reconstruction module carries out the encoding process to enhance or compress the variation in tone value of the specified second image data, while keeping a magnitude order of the specified second image data.

3. An image processing apparatus in accordance with claim 1, wherein said intermediate table generation module comprises a decode table, which stores a mapping of the encoded second image data to non-encoded second image data, and
said intermediate table generation module refers to the decode table to convert the color conversion table and thereby generate the intermediate color conversion table.

4. An image processing apparatus in accordance with claim 1, wherein said color conversion table reconstruction module generates said reconstructed color conversion table, which has a greater number of lattice points than a number of lattice points included in the intermediate color conversion table.

5. An image processing apparatus in accordance with claim 1, wherein said image data decoding module makes the encoded image data obtained by said color conversion module subjected to the decoding process as well as conversion into dot density data, which represents a dot formation density with regard to each of various dots having different tone values expressible by a unit dot.

6. An image processing apparatus in accordance with claim 5, wherein said image data decoding module comprises a conversion table, which stores a mapping of the encoded image data to the dot density data obtained by converting non-encoded second image data, and
said image data decoding module refers to the conversion table to directly convert the encoded image data obtained by said color conversion module into the dot density data.

7. An image processing apparatus in accordance with claim 1, wherein the first color system is an RGB color system and the second color system is a CMY color system.

8. An image processing apparatus in accordance with claim 1, said image processing apparatus further comprising:
a detection module that detects a setting with regard to a priority order between a conversion accuracy of image data and a conversion speed; and
a prohibition module that prohibits operations of said intermediate table generation module when the setting gives priority to the conversion speed over the conversion accuracy.

wherein said color conversion table reconstruction module uses the stored color conversion table, instead of the intermediate color conversion table generated by said intermediate table generation module, to generate the reconstructed color conversion table, when the setting gives priority to the conversion speed over the conversion accuracy.

9. An image processing method that converts image data expressed in a first color system into image data expressed in a second color system, said image processing method comprising:

a first step of storing a color conversion table representing a mapping of second image data expressed in the second color system to multiple lattice points, at which first image data generated in a color space of the first color system and expressed in the first color system are registered, wherein the color conversion table is encoded and represents a mapping of encoded second image data to the multiple lattice points, where the encoded second image data are obtained by an encoding process, which enhances a variation in tone value of the second image data in a predetermined tone area in the first color system, while compressing the variation in tone value of the second image data in a residual tone area;

a second step of making the color conversion table subjected to a decoding process, so as to generate an intermediate color conversion table, where the decoding process restores the variation in tone value enhanced or compressed by the encoding process;

a third step of specifying second image data corresponding to multiple lattice points, which are set to include at least different lattice points from newly added lattice points as well as existing lattice points, which are both included in the intermediate color conversion table, based on the intermediate color conversion table and making the specified second image data subjected to the encoding process, so as to reconstruct a color conversion table that is used for actual color conversion from the intermediate color conversion table and generate a reconstructed color conversion table;

a fourth step of referring to the reconstructed color conversion table to convert the image data expressed in the first color system into encoded image data, which has gone through the encoding process; and a fifth step of making the encoded image data subjected to the decoding process to cancel out the encoding process, thus specifying the image data expressed in the second color system.

10. A computer-readable storage medium having a program stored thereon, said program including computer-executable instructions for causing a computer to attain an image processing method that converts image data expressed in a first color system into image data expressed in a second color system, said program comprising computer-executable instructions causing the computer to execute the following:

a first function of storing a color conversion table representing a mapping of second image data expressed in the second color system to multiple lattice points, at which first image data generated in a color space of the first color system and expressed in the first color system are registered, wherein the color conversion table is encoded and represents a mapping of encoded second image data to the multiple lattice points, where the encoded second image data are obtained by an encoding process, which enhances a variation in tone value of the second image data in a predetermined tone area in the first color system, while compressing the variation in tone value of the second image data in a residual tone area;

a second function of making the color conversion table subjected to a decoding process, so as to generate an intermediate color conversion table, where the decoding process restores the variation in tone value enhanced or compressed by the encoding process;

a third function of specifying second image data corresponding to multiple lattice points, which are set to include at least different lattice points from newly added lattice points as well as existing lattice points, which are both included in the intermediate color conversion table, based on the intermediate color conversion table and making the specified second image data subjected to the encoding process, so as to reconstruct a color conversion table that is used for actual color conversion from the intermediate color conversion table and generate a reconstructed color conversion table;

a fourth function of referring to the reconstructed color conversion table to convert the image data expressed in the first color system into encoded image data, which has gone through the encoding process; and a fifth function of making the encoded image data subjected to the decoding process to cancel out the encoding process, thus specifying the image data expressed in the second color system.

* * * * *